(12) United States Patent
Juarez et al.

(10) Patent No.: US 10,872,391 B2
(45) Date of Patent: Dec. 22, 2020

(54) METHOD AND MEANS TO ANALYZE THERMOGRAPHIC DATA ACQUIRED DURING AUTOMATED FIBER PLACEMENT

(71) Applicant: United States of America as represented by the Administrator of NASA, Washington, DC (US)

(72) Inventors: Peter D. Juarez, Hampton, VA (US); Elizabeth D. Gregory, Hampton, VA (US); K. Elliott Cramer, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 179 days.

(21) Appl. No.: 15/954,126

(22) Filed: Apr. 16, 2018

(65) Prior Publication Data

US 2019/0318444 A1     Oct. 17, 2019

Related U.S. Application Data

(60) Provisional application No. 62/486,099, filed on Apr. 17, 2017.

(51) Int. Cl.
*B32B 41/00* (2006.01)
*G06T 1/00* (2006.01)
(Continued)

(52) U.S. Cl.
CPC .......... *G06T 1/0014* (2013.01); *B29C 70/384* (2013.01); *B29C 70/54* (2013.01);
(Continued)

(58) Field of Classification Search
CPC ...................... G06T 1/0014; G06T 7/90; G06T 2207/30124; G06T 2207/10048;
(Continued)

(56) References Cited

U.S. PATENT DOCUMENTS

| 5,562,788 A | 10/1996 | Kitson et al. |
| 7,171,033 B2 | 1/2007 | Engelbart et al. |

(Continued)

OTHER PUBLICATIONS

K. Croft, L. Lessard, D. Pasini, M. Hojjati, J. Chen, and A. Yousefpour, "Experimental study of the effect of automated fiber placement induced defects on performance of composite laminates," Compostes Part A: Applied Science and Manufacturing, vol. 42, pp. 484-491, 2011, Canada.
(Continued)

*Primary Examiner* — Michael N Orlando
*Assistant Examiner* — Joshel Rivera
(74) *Attorney, Agent, or Firm* — M. Bruce Harper; Andrea Z Warmbier; Helen M. Galus

(57) ABSTRACT

A method of detecting defects in a composite structure includes applying heat to a surface of a composite structure. Thermographic images or frames captured by a moving camera may be utilized to form temporally aligned images that include temperature data (pixels) from a plurality of frames, wherein the (pixels) comprise data captured at a simple (uniform) time delay from the time at which heat was applied. The temporally aligned thermographic data for the surface region may include variations due to differences in thermal transients caused by defects in the composite structure. The variations in the thermographic data may be utilized to detect one or more defects in the composite structure.

16 Claims, 17 Drawing Sheets
(13 of 17 Drawing Sheet(s) Filed in Color)

(51) Int. Cl.
| | |
|---|---|
| B29C 70/38 | (2006.01) |
| B29C 70/54 | (2006.01) |
| G06T 7/90 | (2017.01) |
| H04N 5/33 | (2006.01) |
| G01N 21/88 | (2006.01) |
| G01J 5/10 | (2006.01) |
| G01J 5/00 | (2006.01) |

(52) U.S. Cl.
CPC ............ *G01J 5/10* (2013.01); *G01N 21/8851* (2013.01); *G06T 7/90* (2017.01); *H04N 5/33* (2013.01); *G01J 2005/0077* (2013.01); *G01J 2005/0081* (2013.01); *G06T 2207/10048* (2013.01); *G06T 2207/30124* (2013.01)

(58) Field of Classification Search
CPC ................. G01J 5/10; G01J 2005/0081; G01J 2005/0077; G01N 21/8851; H04N 5/33; B29C 70/54; B29C 70/384; B29C 70/382
USPC ................... 156/60, 64, 350, 351, 378, 379
See application file for complete search history.

(56) References Cited

U.S. PATENT DOCUMENTS

| | | | |
|---|---|---|---|
| 7,513,964 | B2 | 4/2009 | Ritter et al. |
| 2002/0172410 | A1* | 11/2002 | Shepard ................. G01N 25/72 382/141 |

OTHER PUBLICATIONS

F. Shadmehri, O. Ioachim, O. Pahud, J. Brunel, A. Landry, V. Hoa, and Hojjati, "Laser-vision inspection system for auromated fiber placement (AFP) process," 20th International Conference on Composite Materials, Copenhagen, pp. 1-9, Jul. 2015.

J. Cemenska, T. Rudberg, and M. Henscheid, "Automated In-Process Inspection System for AFP Machines," SAE International Journal of Aerospace, vol. 8, No. 2, pp. 1-7, 2015.

B. Denkena, C. Schmidt, K. Voltzer, and T. Hocke, "Thermographic online monitoring system for Automated Fiber Placement processes," Composites Part B: Engineering, vol. 97, pp. 239-243, 2016, Germany.

C. Schmidt, B. Denkena, K. Voltzer, and T. Hocke, "Thermal Image-based Monitoring for the Automated Fiber Placement Process," ScienceDirect, Procedia CIRP, vol. 62, 2017. pp. 27-32, Germany.

S. M. Shepard et al., "Enhancement and reconstruction of thermographic NDT data," AeroSense 2002, International Society for Optics and Photonics, vol. 4710, pp. 531-535, 2002, Orlando, FL.

S. Shephard, "Flash thermography of aerospace composites," IV Conferencia Panamericana de ENO Buenos Aires, pp. 1-7, 2007, Ferndale, MI.

C. Ibarra-Castanedo, N. P. Avdelidis, M. Grenier, X. Maldague, and A. Bendada, "Active thermography signal processing techniques for defect detection and characterization on composite materials," in Thermosense XXXII,, vol. 7661 at 76610O, pp. 1-9, 2010, Orlando, FL.

K. Zheng, Y. S. Chang, K. H. Wang, and Y. Yao, "Thermographic clustering analysis for defect detection in CFRP structures," Polymer Testing, vol. 49, pp. 73-81, 2016.

W. P. Winfree, D. M. Heath, and K E. Cramer, Proceedings of SPIE, "Thermal diffusivity imaging with a moving line source," vol. 4360, 2001, pp. 606-615.

K. C. Wu, B. K. Stewart, and R. A. Martin, "ISAAC—A Testbed for Advanced Composites," 29th American Society for Composites Technical Conference, Sep. 2014, San Diego, CA.

Opencv Dev Team, "Camera Calibration and 3D Reconstruction," 2013. [Online]. Available: https://docs.opencv.org/2.4/modules/calib3d/doc/camera_calibration_and 3d_reconstruction.html, Copyright 2011-2014, but "last updated on May 6, 2018."

R. Grenoble, T. Nguyen, McKenney, A. Przekop , P. Juarez, E. Gregory, D. Jegley and L. Oremont, "Fabrication of a Tailored Cryogenic Propellant Tank Development Article for a Small Launch Vehicle," AIAA SciTech, pp. 1-26, Jan. 2018.

Cramer, K. Elliott, W. Winfree, "Application of the thermal line scanner to quantify material loss due to corrosion," AeroSense2000, International Society of Optics and Photonics, pp. 1-1, Mar. 2000.

NASA/MSFC, Screen Captures from "Robotic Manufacturing System Will Build Composite Rocket Parts Ever Made," video, https://www.nasa.gov/centers/marshall/news/release/2015/robotic-manufacturing-system-will-build-biggest-composite-rocket-parts-ever-made.html, published Aug. 4, 2015.

Jay, Mary Lou, "Robotics Boost Composites Research." article. http://compositesmanufacturingmagazine.com/2015/07/robotics-boost-composites-research-nasas-new-isaac-project-laboratory-research/, Jul. 1, 2005.

Blom, A. W., C. Lopes, P. J. Kromwijk, Z. Gurdal, and P.P. Camanho, "A theoretical model to study the influence of tow-drop areas on the stiffness and strength of variable-stiffness laminates." Journal of Composite Materials, pp. 403-425, 2009.

Nik, M. A., K. Fayazbakhsh, D. Pasini and L. Lessard, "Optimization of variable stiffness composites with embedded defects induced by automated fiber placement," Composite Structures, vol. 107, pp. 160-166, 2013.

Cramer, K. E., A.R. Jacobstein, and T. L. Reilly, "Boiler tube corrosion characterization with a scanning thermal line," Aerospace/Defense Sensing, Simulation, and Controls, International Society for Optics and Photonics, Mar. 23, 2001.

Cramer, K. E. and W.P. Winfree, "Thermographic imaging of material loss in boiler water-wall tubing by application of scanning line source," SPIE's 5th Annual International Symposium on Nondestructive Evaluation and Health Monitoring of Aging Infrastructure, International Society for Optics and Photonics, pp. 1-11, Jun. 9, 2000.

Woolard, D.F. and K.E. Cramer, "Line scan versus flash thermography:comparative study on reinforced carbon-carbon," Defense and Security, Proc. SPIE 5782. pp. 315-323, 2005.

Grenoble, R., T. Nguyen, M. McKenney, A. Przekop, P. Juarez, E. Gregory & D. Jegley, "Fabrication of a Composite Tow-Steered Strusture for Air-Launch Vehicle Applications," AIAA/ASCE/AHS/ASC Structures. Structural Dynamics, and Materials Conference, pp. 1-14, Jan. 8-12, 2018.

Gregory E. & P. Juarez, "In-Situ Thermography of Automated Fiber Placement Parts", 44th Annual Review of Progress in Quantitative Nondestructive Evaluation, vol. 37, AIP Conf. Proc. 1949, 060005-1-060005-8, Jul. 16-21, 2017.

Juarez. P. D., K. E, Cramer, & J.P.Seebo, "Advances in in situ inspection of automated fiber placement systems," Thermosense: Thermal Infrared Applications XXXVIII, Proc. SPIE 9861, 986109. 1-986109-8, May 11, 2016.

Hoa, S.V., "Principles of the Manufacturing of Composite Materials," DEStech Publications, Inc., p. 190-193, 301-324, Lancaster, Pennsylvania, 2009.

Shadmehri, F., X. Cai, M, Hojjati, J. Chen, S.V. Hoa, "Effect of autoclave process on the quality of thermoplastic composite truncated cones manufactured using automated fiber placement technique." Science and Engineering of Composite Material, pp. 175-186, 2015.

Halbritterr, A. and R. Harper, "Big Parts Demand Big Changes to the Fiber Placement Status Quo," SME Composites in Manufacturing. Charleston, SC, 2012.

Blom, A., "Structural Performance of Fiber-Placed, Variable-Stiffness Composite Conical and Cylindrical Shells," PhD Thesis, Delft University of Technology, 2010.

Croft, K, L. Lessard, D. Pasini, M. Hojjati, J. Chen, A. Yousefpour, "Experimental Study of the Effect of Automated Fiber Placement Induced Defects on Performancce of Composite Laminates," Composites: Part A, 42, pp. 484-491, 2011.

Cai X., "Determination of Process Parameters for the Manufacturing of Thermoplastic Composite Cones Using Automated Fiber Placement," Master of Applied Science Thesis, Concordia University, Jun. 2012.

(56) References Cited

OTHER PUBLICATIONS

Wu, K.C, J. Jackson, L. Pelham, B. Stewart, "NASA Automated Fiber Placement Capabilities Similar Systems, Complementary Purposes," Composite Materials and Manufacturing Technologies TIM, National Center for Advanced Manufacturing, pp. 1-12, New Orleans, Louisiana, May 6-7, 2015.

E. Oromiehie, B. Prusty, P. Composition & G. Rajan, "In situ process monitoring for automated fibre placement using fibre Bragg grating sensor," Structural Health Montioring, vol. 15(6), pp. 706-714, 2016.

* cited by examiner

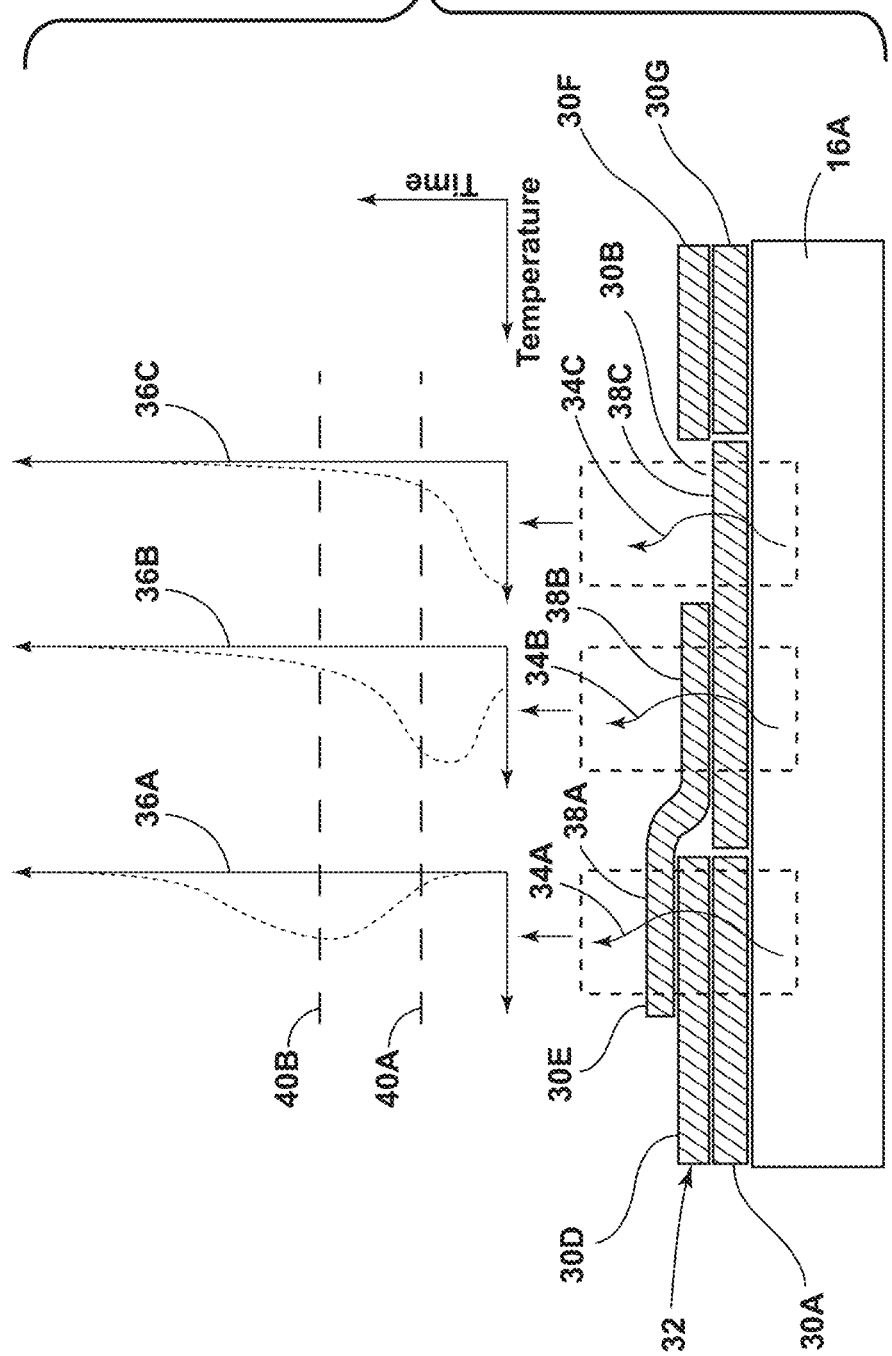

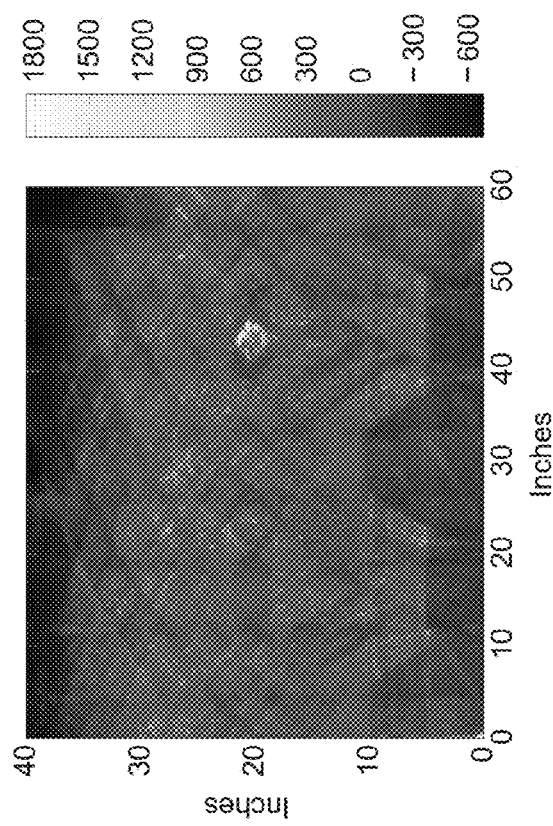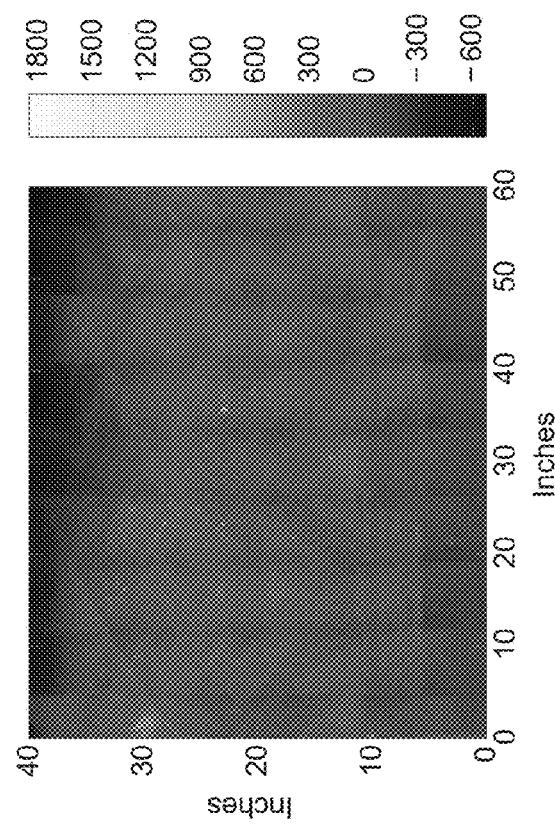

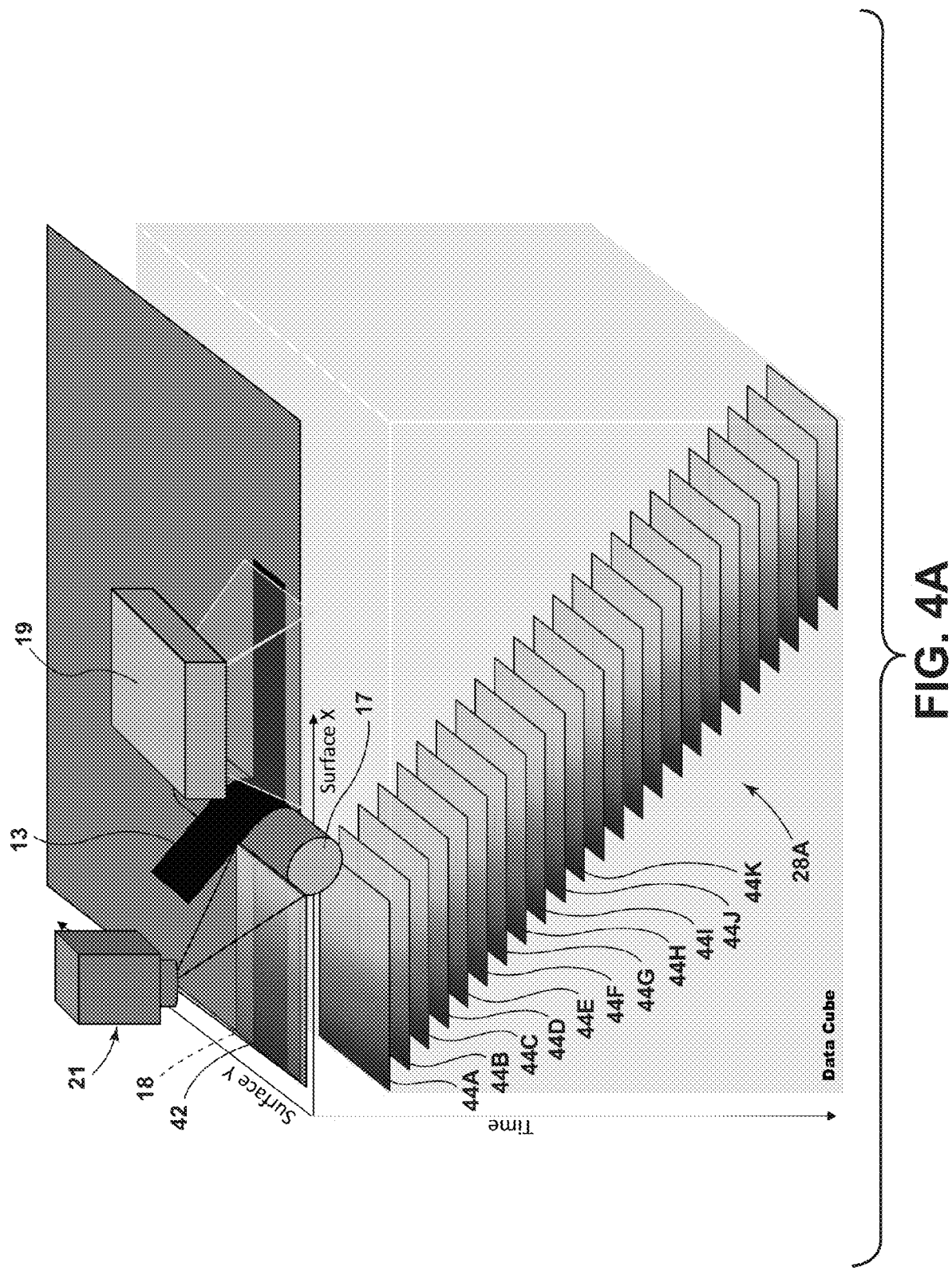

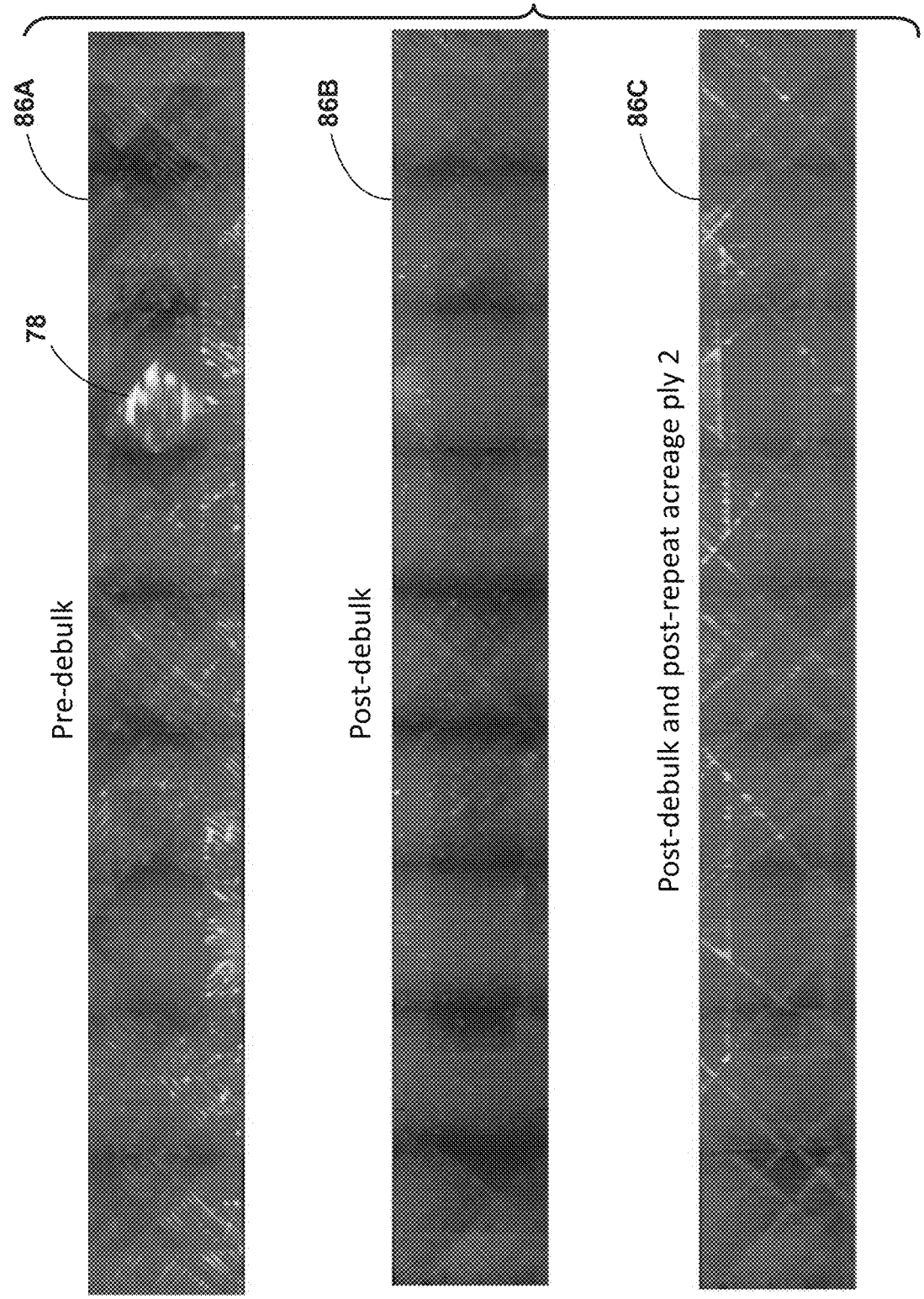

METHOD AND MEANS TO ANALYZE THERMOGRAPHIC DATA ACQUIRED DURING AUTOMATED FIBER PLACEMENT

CROSS-REFERENCE TO RELATED PATENT APPLICATION

This patent application claims the benefit of and priority to U.S. Provisional Patent Application No. 62/486,099, filed on Apr. 17, 2017, the entire contents of which is hereby incorporated by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

Automated fiber placement (AFP) systems have been developed to deposit composite tow tape onto a substrate in a predefined manner to thereby fabricate composite structural components. Automated fiber placement uses discrete tows of carbon fibers that are pre-impregnated with epoxy resin to build up a composite part, either on a flat table or a non-planar tool. The part is then cured, often in an autoclave, where it becomes hardened. The tows are delivered and stored on spools that are mounted on the AFP machine. Multiple tows make up a course and are placed concurrently in a specific orientation. Each layer of multiple courses is called a ply. The spools are loaded onto the AFP head and then tows are gathered by the head and placed on a substrate. The resin becomes tacky when heated so a heat source, often a lamp, is used to heat the substrate prior to a new course being placed over it. The new course is then pressed into the substrate with a compaction roller mounted on the AFP head. In most cases, a course has a constant orientation and all the courses in a ply have the same orientation, but when a course is 'steered,' meaning the AFP machine is changing orientation during a course, then it is referred to as 'tow-steered.'

Thermography is a useful method for nondestructive inspection and evaluation of composite structures. The foundational mechanism of thermography is that heat flows through a homogeneous material in a uniform manner. By observing variation in surface temperature information about the underlying structure can be deduced. Thermography can provide more information about thin materials, as discontinuities located far away (below) from the surface being observed have a reduced effect due to heat diffusion.

Flash thermography is a known process that may be used to evaluate composite structures. In this process, a flash head is positioned over a surface of a part, and a thermal impulse from a heat source is applied to the surface of a part. A thermal camera captures temperature data for the surface after heating. Thus, in this process, heat is applied to the surface of the part under the flash head at the same time. Various tools (e.g. software) have been developed to process thermal data collected using the flash thermography process.

A signal reconstruction method for quantitative analysis of time dependent thermographic data to yield specific information about the depth and size of embedded defects has been proposed (see S. M. Shepard, "Enhancement and reconstruction of thermographic NDT data," AeroSense: International Society for Optics and Photonics, vol. 4710, pp. 531-535, 2002). This theory has been extended to include composite (layered, anisotropic) materials (see S. Shepard, "Flash thermography of aerospace composites," IV Conferencia Panamericana de END Buenos Aires, p. 7, 2007).

In addition to the signal reconstruction discussed above, principal component analysis techniques have been applied to thermal data sets to better isolate the location and size of defects (see C. Ibarra-Castanedo, N. P. Avdelidis, M. Grenier, X. Maldague, and A. Bendada, "Active thermography signal processing techniques for defect detection and characterization on composite materials," in Thermosense XXXII, vol. 7661, 2010, p. 766100). Many of the techniques used for image or video analysis and computer vision can be applied to thermographic data. For example, image segmentation and minimum spanning tree clustering may be used to automate the identification and localization of defects in thermal data (see K. Zheng, Y. S. Chang, K. H. Wang, and Y. Yao, "Thermographic clustering analysis for defect detection in CFRP structures," Polymer Testing, vol. 49, pp. 73-81, 2016).

With reference to FIG. 1, a known AFP system 1 may include a plurality of spools 2 that feed carbon fiber tape 3 to a collimator 4 of AFP head 5. The AFP head 5 may be mounted on a robotic arm (not shown) that is controlled by a control system to move the head 5 in a predefined manner relative to a substrate 6. An applicator such as a compaction roller 7 compacts and positions a layer of tape 8 onto substrate 6. A heat source such as lamp 9 mounted on AFP head 5 heats a region 6A of substrate 6 before the carbon fiber tape 3 is deposited onto substrate 6. The heating facilitates bonding between the carbon fiber tape 3 that is being applied and the substrate 6. Substrate 6 may comprise layers 3A of carbon fiber tape 3 that have previously been deposited onto a tool 26 corresponding to a surface shape of a finished part that is to be fabricated by the AFP system 1.

Known processes for composite part fabrication by AFP can result in a number of flaws such as gaps (unintended space between tows), laps (when tows overlap) and twists (when a tow is twisted and a portion of it does not lie flat). A common inspection method to detect these and other defects is visual inspection. An AFP part might also have flaws that are difficult to detect, such as insufficient adhesion between plies or tow peel-up in the presences of complex geometry. Various evaluation tools/processes beyond visual inspection have also been developed in an effort to identify defects in composite structures. Known evaluation techniques may utilize image processing that focuses on tow tape alignment defects such as twists, overlaps, and gaps. Known processes include vision-based stereoscopic systems, laser profilometry measurements, and image processing of pixel intensities of individual thermal "snapshots" of an AFP layup.

Although prior approaches are capable of identifying some defects with respect to tape geometry, existing approaches may be limited in their ability to detect other types of defects in composite structures.

BRIEF SUMMARY OF THE INVENTION

One aspect of the present invention is a process of using thermal image data that may be collected or captured during composite automated fiber placement to provide in situ thermal nondestructive evaluation for assessing part quality. A thermal imaging camera may be mounted to the head of an AFP robotic system such that the camera captures thermal images after the tow is applied to a heated substrate. Because the heat source and the thermal camera are moving relative to the part, the images or frames captured by the thermal camera include surface regions or pixels that were heated at different times relative to the time an individual image ("frame") was captured.

The time history of the temperature of a small area such as a specific pixel or "point" (or cell) on the part is obtained by identifying where that point appears in each frame (camera image). It will be understood that each "point" may comprise, for example, a small square or rectangular area. The time history of temperatures of each individual point may be assembled in the same manner. The time histories of each point can be treated as being independent of each other, and the time histories may be digitally aligned so that the individual points act as if they are heated and cooled in sync. This new temporally aligned data is somewhat similar to other thermal nondestructive evaluation (NDE) data sets (e.g. thermal images captured using a flash thermography process). This permits application of known thermal signal reconstruction algorithms previously used for flash thermography or other such techniques to the aligned data. Algorithms such as principal component analysis, time derivatives, thermal diffusivity imaging and thermal signal reconstruction can be used to identify variations in heat conduction in the new temporally aligned data set. These types of variations may be caused by insufficient tow/ply adhesion, tow peel up, tow misalignment, tow twist/fold, thickness variations, foreign object debris and/or other defects. Image processing algorithms may also be used to characterize areas of concern.

The AFP robot may be configured to record tool-tip position in the world coordinate position (3 dimensions spatially) during layup. This information can be used to spatially register each image with a model of the part (by transforming the projected data into part coordinates) with a high level of precision. Then, in the same manner described above, the time history of the temperature of each point on the part can be assembled and analyzed. The results of this analysis are in part coordinates, and the results can be easily correlated to locations on the physical part.

After the part is laid up (or in between ply layers) a thermal line scan methodology (e.g. U.S. Pat. No. 6,000,844) may be implemented using the same AFP robotic equipment. Composite parts made with an AFP typically include a ply layer ("acreage ply") that covers all or most of the part. To perform the thermal line scan, the AFP operator runs the acreage ply program on the AFP robot without laying up new material or compacting (using zero tow feed and a small surface offset). The ply program may be run at a constant speed and full heat-lamp output while the onboard thermal camera collects data.

The thermal line scan process utilizes the AFP robot as a robotic inspection platform that is capable of implementing thermal line scan inspections. The data can be processed using the techniques and analysis method described above. This process can be used at multiple stages of the composite fabrication, including between each ply layer, before and after vacuum-assisted debulking, and even after the part has been fully cured.

Additionally, by taking multiple line scans after different stages of the part's fabrication, it is possible to create a timeline of the entire structure that tracks the evolution of the intended geometry and features. This is a valuable tool, since it is difficult to predict both the occurrence of tow-tape defects, and whether or not those defects will self-correct during subsequent ply layers and curing.

One aspect of the present invention is a method of detecting defects in a composite structure fabricated by an automated fiber placement (AFP) process. The method includes applying heat to the surface of a composite structure using a heat source that moves relative to the composite structure. A series of initial thermographic images (frames) of the surface are captured after the surface is heated. The initial thermographic images are captured using a camera that moves with the heat source relative to the composite structure. The method includes forming at least one temporally synchronized image comprising sections of a plurality of the initial thermographic images, wherein the sections correspond to portions of the surface that were heated at the same time interval prior to capturing the image section. The temporally synchronized image includes variations that may be utilized to detect one or more defects in the composite structure.

Another aspect of the present invention is a method of evaluating physical properties of a fiber reinforced composite structure. The method includes heating at least a portion of the composite structure using a heat source that moves relative to the composite structure. A series of groups of thermographic image data (frames) of the surface of the composite structure are captured after heating the composite structure. The thermographic image data is captured using a thermographic camera that moves relative to the composite structure. The method includes time shifting thermographic image data from a plurality of the groups of thermographic image data to form at least one temporally synchronized image. The temporally synchronized image comprises thermographic image data for a surface region at an equal time from heating. Variations in the temporally synchronized image are utilized to identify defects in the composite structure.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 3 is a schematic showing heat flow and temperature variations in tow after the tow has been applied to a heated substrate;

FIG. 3A is an image showing temporally aligned ("composite") in situ thermography data, showing deviation from an expected value before a debulking cycle;

FIG. 3B is an image showing temporally aligned in situ thermography data, deviation from an expected value after debulking cycle;

FIG. 4A is an isometric schematic view of an AFP system, infrared camera, and image data;

FIG. 13 comprises temporally aligned thermographic image data for a composite structure pre-debulk, post-debulk, and post-repeat acreage ply 2.

DETAILED DESCRIPTION OF THE INVENTION

Figure 2:
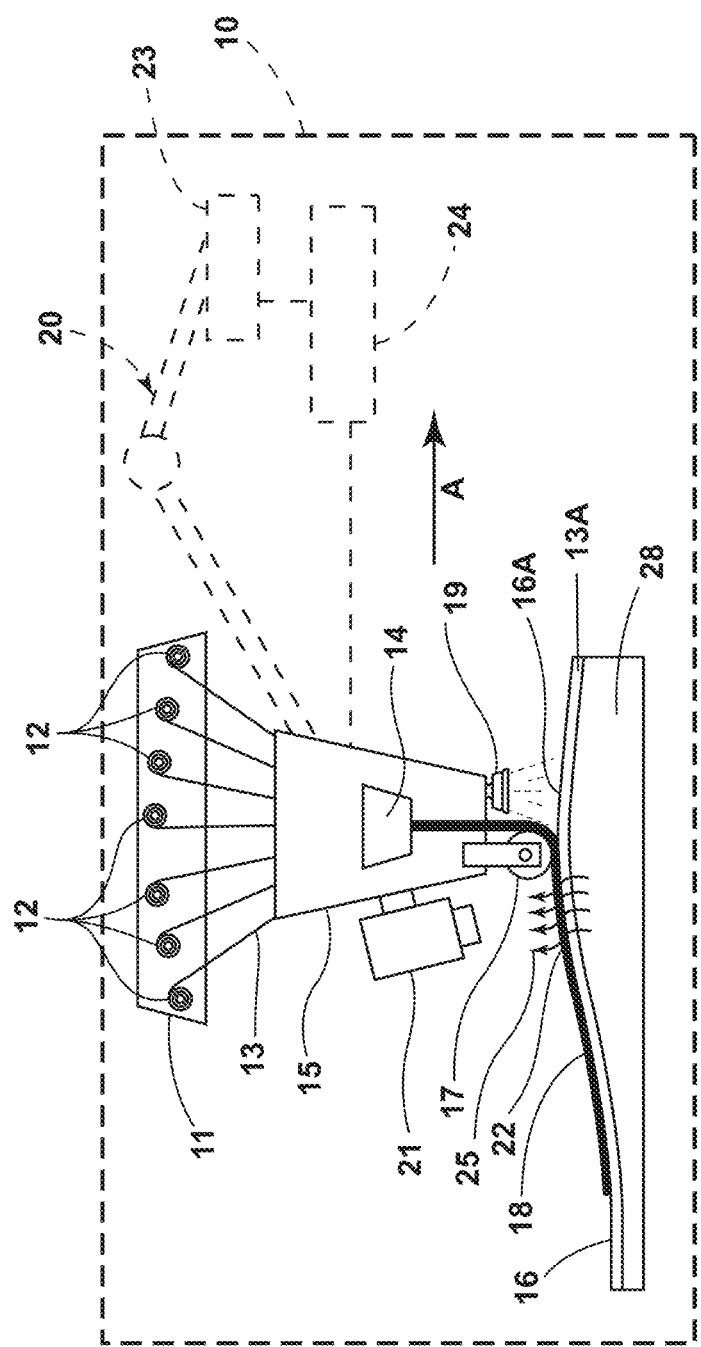
FIG. 2 is a schematic view of an AFP system and infrared camera according to one aspect of the present invention.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 2, an automated fiber placement (AFP) system 10 includes a fiber dispensing system 11 that feeds prepreg composite tape 13 to a movable head 15 from spools 12. The tape 13 may comprise prepreg carbon fiber tape or other tape as required for a particular application. The head 15 may include a collimator 14 and applicator such as compaction roller 17 that positions a layer 18 of tape 13 onto a substrate 16 that has been heated by a heat source such as a lamp 19. An infrared (thermal) camera 21 may be mounted to the head 15 to capture thermal image data from surface 22 of layer 18 immediately after the layer 18 is deposited onto heated surface 16A of substrate 16. Thermal camera 21 may comprise an FLIR A65, which uses an uncooled microbolometer sensor to capture 14 bit linear temperature data in 640×512 resolution at a rate of up to 30 Hz. Camera 21 is powered and communicates with controller 24 via gigabit Ethernet connection using the industry standard GigEVision protocol. Thermal camera 21 may be mounted near an existing visible light camera (not shown), which is used by the operators to monitor the roller 17. The cameras point to a region directly behind the compaction roller 17 to observe the material immediately after lay up as it passes underneath the roller 17. The placement of the camera 21, coupled with an installed 50 mm lens, enable capture of an approximately 3 inch by 4 inch region behind the roller 17, giving a 100 pixel/inch density. Substrate 16 and 16A may comprise prior layers 13A of tape 13 that were positioned in prior passes of head 15. Alternatively, substrate 16 may comprise a surface of a tool 28.

Thermal energy 25 from substrate 16 raises the temperature of surface 22 of layer 18 due to heat transfer from heated surface 16A through layer 18. Camera 21 is positioned to generate thermal images of surface 22 immediately after the composite layer 18 is applied to heated substrate surface 16A by compaction roller 17. As discussed in more detail below, variations in layer 18 and/or substrate 16 result in variations in the temperature of surface 22. These temperature variations may be evaluated to detect and identify defects in layer 18 and/or substrate 16.

The AFP system 10 may include a robotic arm 20 having a base 23. The head 15 is mounted to robotic arm 20, and a controller 24 may be programmed to cause robotic arm 20 to move head 15 relative to substrate 16 along a plurality of predefined paths to thereby position the composite tape according to a predefined design or configuration. During operation, the head 15 may move relative to substrate 16 in the direction of the arrow "A." The substrate 16 may be stationary relative to robotic arm 20, or the substrate 16 may be movable (e.g., rotatable) relative to the robotic arm 20. The robotic arm 20 comprises a modified industrial robotic arm that is movably mounted on a linear track (not shown) whereby the base 23 of robotic arm 20 travels along a horizontally linear path relative to substrate 16. The robotic arm 20 may comprise an existing robotic arm developed for the Integrated Structural Assembly of Advanced Composites (ISAAC) project. However, it will be understood that various automated fiber placement (AFP) systems have been developed, and the present invention is not limited to a particular AFP device or system.

Figure 1:
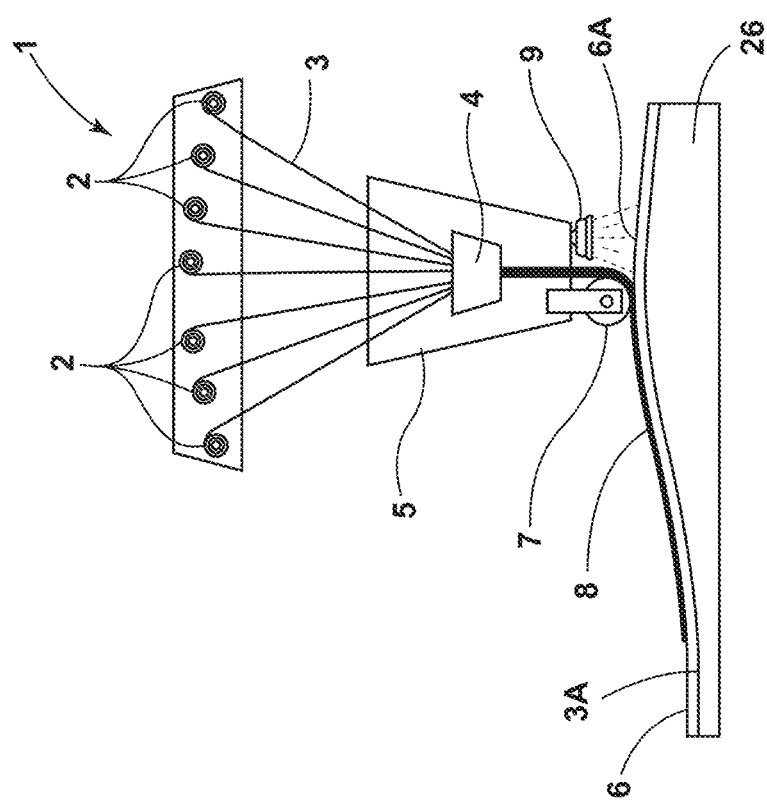
FIG. 1 is a schematic view of a prior art automated fiber placement (AFP) device.

Thermography may be utilized to provide a visual representation of the thermal conductivity of a part. One aspect of thermography is that information about underlying structure can be obtained or deduced by observing the surface temperature of volume over time in the presence of known heating conditions. As discussed above in connection with FIG. 1, known AFP processes utilize a heat source to aid with compaction and adherence. Immediately before new material is placed on the tool or a previous layer the surface is heated (FIG. 1). The heat source is often a lamp 9 but can also be a laser or heat gun. By observing and analyzing the time history of the surface after a new course is applied one can assess part quality using established thermographic nondestructive evaluation (NDE) techniques and image processing algorithms. This type of assessment is significantly faster and less subjective than visual inspection and allows for repairs to be made during fabrication, reducing the risk of curing a part of unacceptable quality.

Two methods of thermography inspection may be used for in situ evaluation. One method involves observing the surface of a new ply layer as it is placed over a pre-heated substrate. FIG. 3 shows simplified examples of signals that would be expected for an ideal (defect-free) layup, wherein heat is conducted upward from the heated substrate. Laps, over lapping tows, or tows with poor adhesion are typically colder because the material is thicker. Gaps are typically hotter because the camera "sees" the heated substrate. Also, after plies are placed, the AFP robot may be used as a moving heat source and camera to perform a line scan. To perform a thermographic line scan, the surface of the laminate is heated, and the heat diffusion is observed (captured with a thermal camera). A post layup scan process has been used to inspect post cure composite panels (see W. P. Winfree, D. M. Heath, and K. E. Cramer, "Thermal diffusivity imaging with a moving line source," in Thermosense XXIII, vol. 4350, 2001, pp. 606-615).

Prepreg tow strips 30A-30C (FIG. 3) may be deposited on a heated substrate 16A, and one or more additional prepreg tow strips 30D-30F may be positioned on (over) the lower prepreg tow strips 30A-30C in various configurations as required for a particular layup of a composite structure 32. Heat flows from heated substrate 16A as shown by arrows 34A-34C. Graphs 36A-36C correspond to heat arrows 34A-34C, respectively, and show temperature as a function of time. As shown by graphs 36A-36C, temperature at surfaces 38A-38C will typically rise as the heat flows from heated substrate 16A to the surfaces 38A-38C, and the surfaces 38A-38C will then begin to cool. In the illustrated example, surface 38A has a delayed temperature peak due to the increased thickness resulting from three layers 30A, 30D, and 30E of tow below surface 38A. Surface 38C reaches a temperature peak more quickly because the surface 38C corresponds to a single layer 30B of tow tape between surface 38C and heated substrate 16A. Surface 38B corresponds to two layers 30E and 30B of prepreg tow, and the temperature of surface 38B therefore reaches a peak at a time that is between the time at which the peak temperature occurs for surfaces 38A and 38C. It will be understood that FIG. 3 is schematic in nature, and generally shows temperature and heat transfer characteristics that may be associated with different tow layups. However, the heat versus time profile for a given composite structure and layup may vary from the examples of FIG. 3.

As discussed above, as the prepreg tow strips 30 are being applied by head 15 (FIG. 2) of AFP system 10, the head 15 moves relative to the substrate 16. Accordingly, the time versus temperature graphs of FIG. 3 generally correspond to a distance of the surfaces 38A-38C from the compaction roller 17. Thus, thermal images captured by camera 21 at times 40A and 40B (FIG. 3) will show differences in the surface temperatures of the surfaces 38A-38C due to the differences in the temperatures of the surfaces 38A-38C at the times 40A and 40B. Also, as discussed in more detail below, defects in the composite structure 32/substrate 16 and/or the prepreg tow strips 30A-30F will also result in surface temperature variations that are visible/detectable in thermal images captured by camera 21.

Every frame of data that is collected can be analyzed in at least two distinct ways. First, the frame can be viewed as an independent data set. Image analysis techniques can be used to identify flaws in individual frames. Second, each frame may be used as a component in a larger data set. By also collecting global position data of the AFP head 15 at the time a frame is captured it is possible to register each frame into global coordinates by:

$$\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad (1.0)$$

where $t_*$ are the translation vector components, $r_*$ are the rotation matrix components, $[X, Y, Z]^T$ is the global position of a point on the part, $f_*$ are the focal lengths, $c_*$ are the center pixel coordinates, and $[u, v]^T$ are the image coordinates in pixels. This equation assumes a pinhole camera with no lens distortion. However, this assumption is not valid in all cases. In cases where the lens distortion is significant it may be necessary to do a spacial calibration to determine the lens distortion and correct for it. In that case, $[u, v]^T$, will refer to the image coordinates after lens correction.

Figure 4:
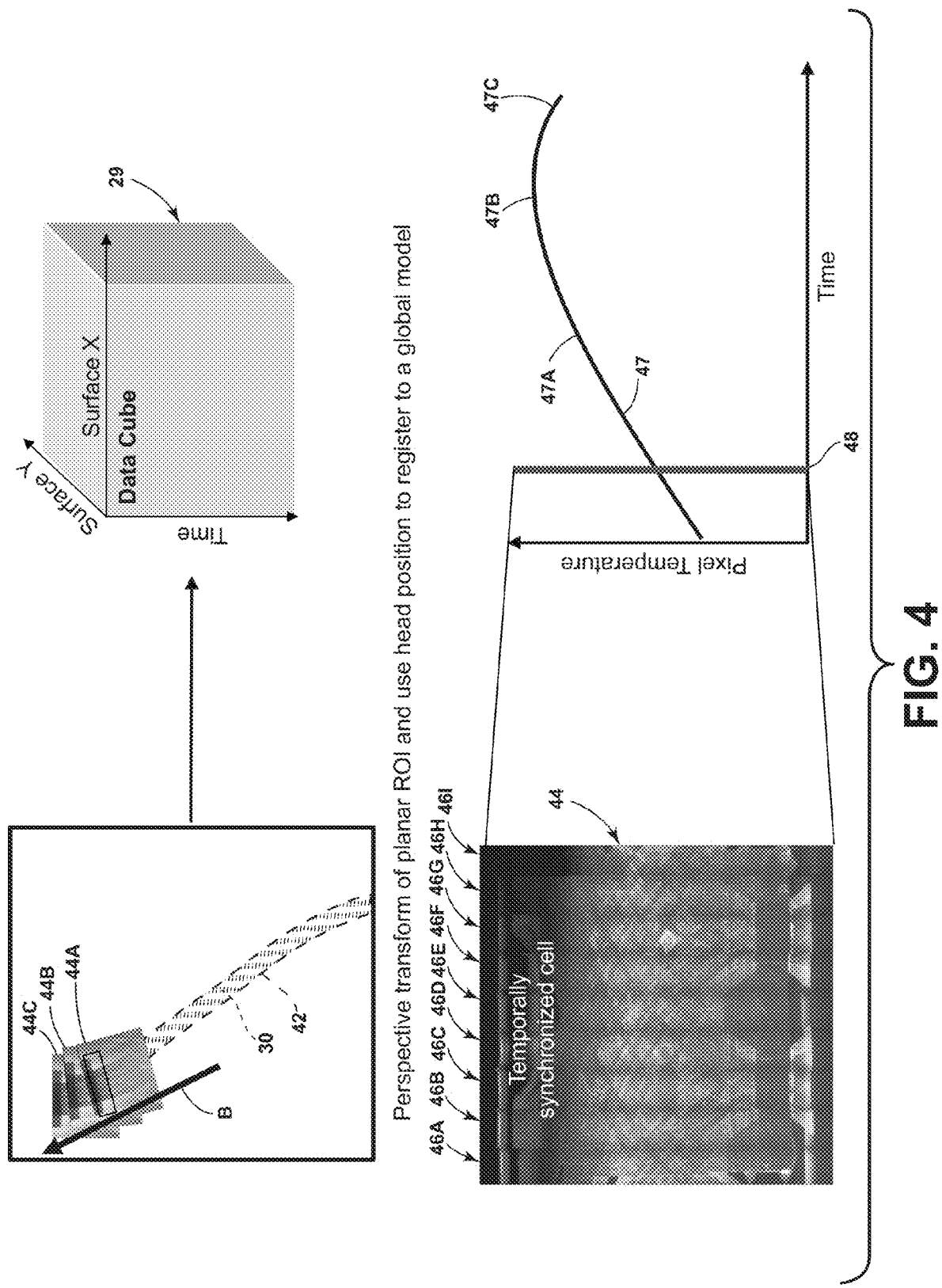
FIG. 4 is a schematic view of a material course, a thermal image, and a graph showing temperature of the tow surface over time.
Figure 4B:
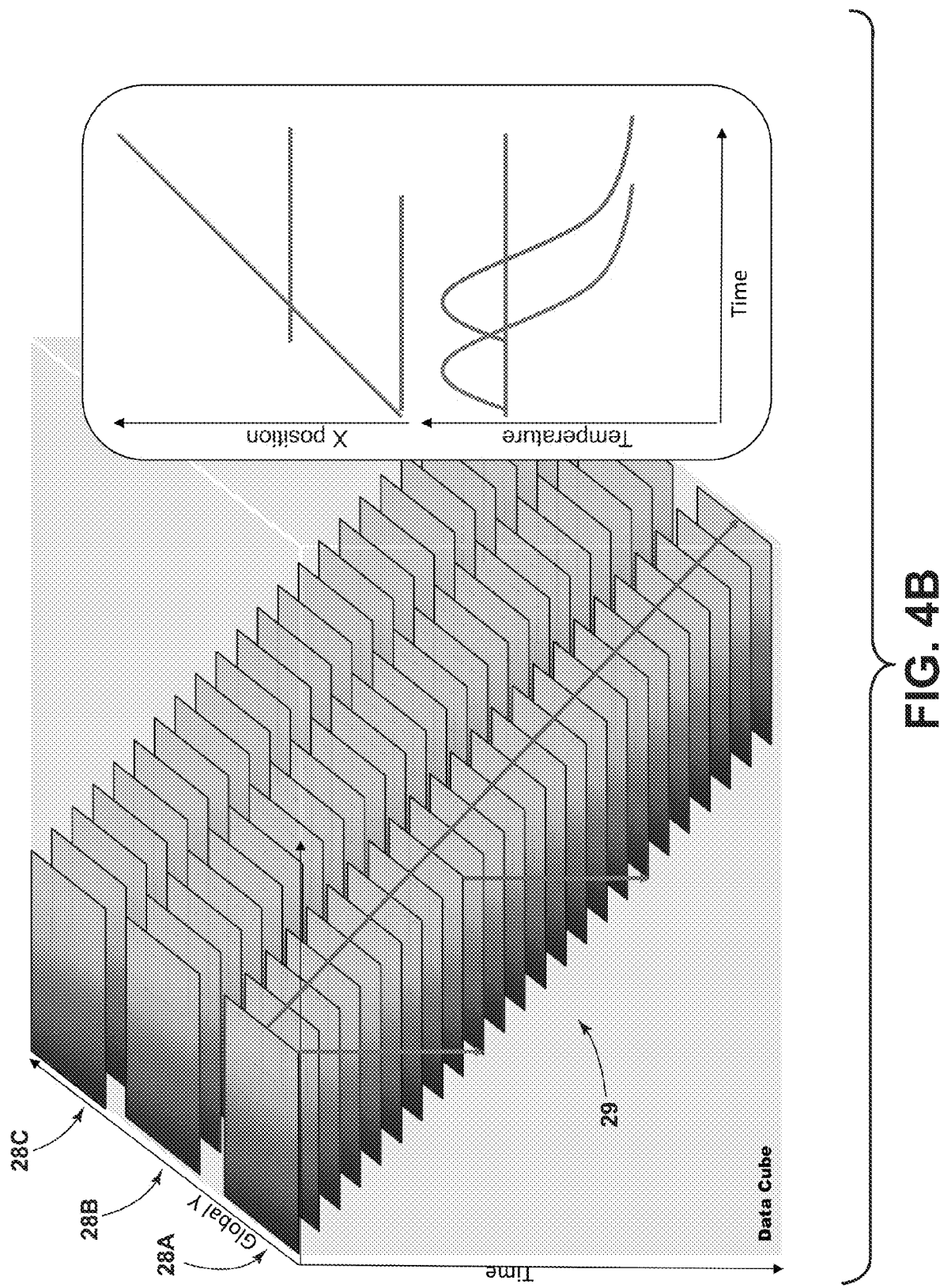
FIG. 4B is a schematic showing image data generated by the infrared camera of FIG. 4A.

It may be assumed that each frame images the same location relative to the heat source at all times (e.g. that any given frame in the sequence of frames captured by the thermal camera is imaging the same location as a number of the frames before it, but at a different relative distance to the heat source and by extension at different amounts of elapsed time since it was first heated). Thus, every pixel (or small area) in the frame corresponds to a specific discrete area of the surface of a part at a point along its cooling curve (temperature vs time). FIGS. 4, 4A, and 4B illustrate how a plurality of frames may be organized into a three dimensional data cube. For simplicity, this schematic illustration assumes frames are captured at a constant rate and the AFP head 15 is moving at a constant speed. If the AFP system 10 is capable of reporting position data then these assumptions are not necessary as the actual position for each frame can be recorded. This actual position data may be required to register images for more complex paths and geometry. The coordinates in the data cube, i, j and k represent two spatial dimensions and one time dimension, respectively. As the AFP head 15 moves it heats areas in succession, but it may be more useful to assume that for every area heating starts at a $t_0$. The time dimension for each pixel may be shifted to align the heating curves to correct for the time delay in heating as a result of the lamp 19 moving across the part. Thus, the data may be utilized to form a series of temporally synchronized images whereby the image data may be observed relative to the initial heating time, to, and not with respect to absolute time.

The image data that is collected is an integer signal from the detector (thermal camera). This data may be transformed into absolute temperature. It is typically simpler and more memory efficient to keep that value in counts (e.g. a 14 bit integer). To compare any two data sets, and even for different locations in the same data set, all data is preferably corrected to compensate for the varying amount of heat being applied to a part over time. The method calculates an expected value and then determines if a deviation from the expected value has occurred. The expected value of a pixel, in counts, may be calculated by $$V_{exp}[i,j] = \frac{n_x \sum_x V_{obs}[x,j] + n_y \sum_y V_{obs}[i,y]}{n_x N_x + n_y N_y}, \quad (2.0)$$

where $V_{exp}[i,j]$ and $V_{obs}[i,j]$ are the expected and observed value of the pixel in row i and column j; $N_x$ and $N_y$ are the total number of pixels in each row and each column; and $n_x$ and $n_y$ are the correction weights for the rows and columns.

The expected value calculated by equation 2.0 uses correction weights for rows and columns based on overall heating trends. This correction scheme is predicated on the assumption that a scan is adding heat to the entire laminate over time so the average temperature of the part increases as data is being collected. If the scan is following a raster pattern of up, down, left to right, then the frames collected at the beginning of a raster column are, on average, cooler than frames at the end of the column. This trend is typically more pronounced for frames on the left compared to those from the right. It will be understood that if the stability of the heat source is well controlled the variance from left to right may be minimized. For example, laser heating typically does not have this effect. Also, this trend is minimized or eliminated if the heat lamp is fully warmed up to equilibrium prior to layup. Control of the temperature of the substrate may also help alleviate these issues. The correction weights can be determined by the slopes of the general vertical and horizontal trend or by some other suitable function that describes the heating. The deviation from the expected value for each pixel may be calculated by $$\in[i,j]=V_{exp}[i,j]-V_{obs}[i,j]. \quad (3.0)$$

FIGS. 3A and 3B are temporally aligned images showing deviation from an expected value for a composite structure. FIG. 3A shows the deviation from the expected value prior to a debulk process, and FIG. 3B shows the deviation from the expected value post-debulk.

As discussed above, data may be collected in at least two ways. First, data may be collected while fiber tows are being placed utilizing an in situ process. Second, data may be collected using a line scan process using AFP motion for a constant orientation ply that fully covers a part (referred to as an acreage ply). This is done with no fiber being placed, no variation in speed, no compaction force on the roller 17, and the heat lamp 19 at maximum power. This second process for data collection may be referred to as a scan or line scan. In the line scan process the laminate is heated from the top surface. Conversely, in the in situ process the new ply is heated by the substrate below the new ply. As a result of these different heating configurations, defects may appear differently. For example, a delamination may appear colder in situ but hotter in a scan.

Scan data may be preferred in some circumstances. For example, if system 10 does not provide specific position data from the robotic head 15, position must be inferred based on part geometry. This may be easier and more accurate when velocity and tow orientation are constant, which allows data to be collected in a raster scan pattern. Also, tow peel-up over time may be a concern in some applications. Therefore, after the course is placed, allowing time between when fiber placement and scanning increases the opportunity to observe tow peel-up.

Comparing FIGS. 3A and 3B, it is apparent that the number of hot spots is reduced significantly post debulk. Most notably one of the build up patches on the part (the yellow region at about 40, 20 inches) appears to be a very hot in FIG. 3A prior to debulk, implying it has very poor adhesion with the substrate prior to debulking. This spot completely disappears after debulk (FIG. 3B).

The deviation from the expected value appears to be Gaussian in distribution, so a straightforward method of comparing the overall deviation from the expected value was to compare standard deviations. During testing of a part, the distribution of the deviation from the expected value for all pixels demonstrated that the standard deviation was reduced by debulking for this test part. The expected value in this example is based on averaging so it is a measurement of the "sameness" of pixel values. The process may be utilized for parts having different geometries. For example, during testing the same process was completed for a composite cylinder structure. The scans of the cylinder were completed by running the program for a full coverage ply that was one continuous helical path, without laying fiber. In addition to analyzing the laminate quality prior to cure, the collected data enables engineers and designers to make predictions regarding post-cure part quality.

Figure 3C:
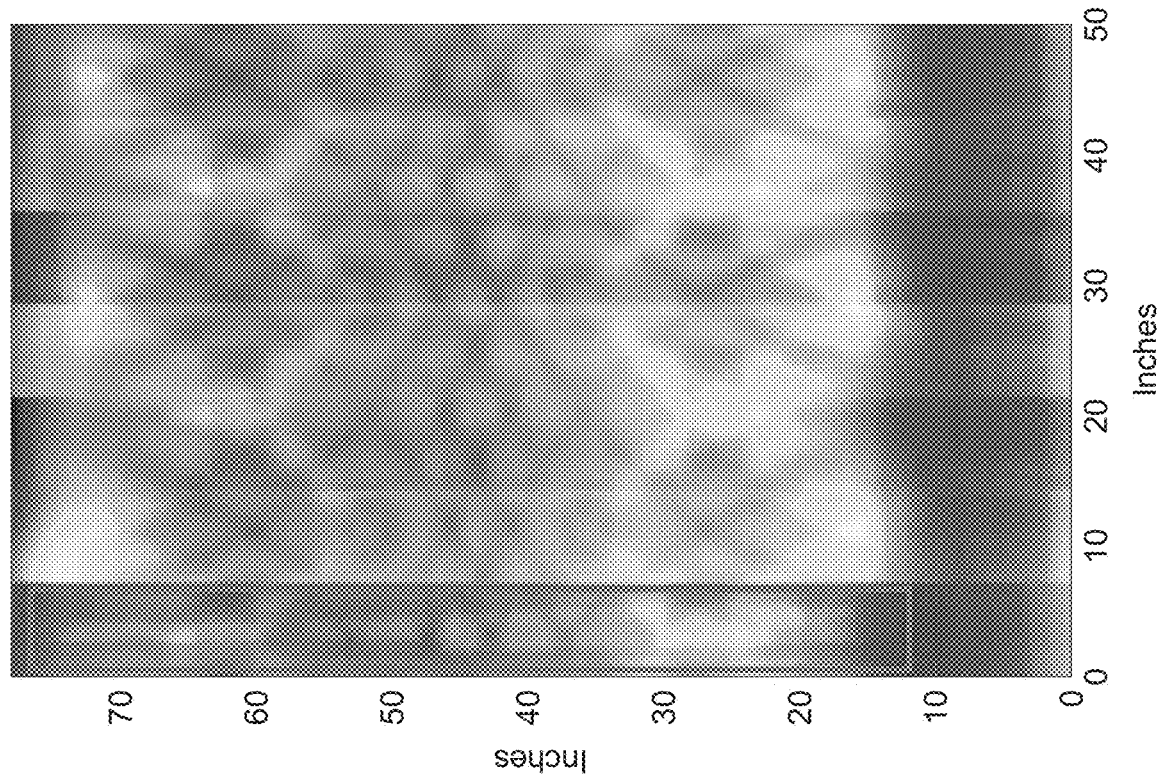
FIG. 3C is a post cure thermal line scan of a part, wherein the data is temporally aligned and spatially registered.

In order to establish a relationship with post-cure part quality thermal line scan data of a composite structure may be collected after cure. This process does not necessarily require use of an AFP system. For example, in one test this scan was completed in a laboratory where the composite structure (a cylinder) was placed in a rig that rotated the cylinder at a constant speed. A thermal camera was placed at various positions along the length of the cylinder, and the thermal camera collected data for a complete rotation. The part was heated by a line source located below the thermal camera. FIG. 3C shows the temporally aligned and spatially registered data for part of the length of the cylinder (the cylinder is not the same part used to generate FIGS. 3A and 3B). This data (FIG. 3C) is not deviation from the expected value; it is raw counts. Brighter areas may be areas where the laminate is thinner or areas where heat is not being conducted through the thickness as efficiently as darker areas. Likewise, areas that are darker may be thicker. The bright yellow "X-like" areas in the lower half of FIG. 3C (and less obviously, in the upper half) correspond to the areas between tow-steered plies that are thinner. There also appears to be some overlap of tow-steered plies or thickening of those plies at the edges of a course. This may be the result of tow peel-up. One feature that was not observed in the pre-cure data was the strip of varying width (outlined by a blue box) on the left side of FIG. 3C. This strip of lighter areas may be from a helical ply.

With reference to FIG. 4, head 15 deposits the tow strips 30 along a material course or path 42. The head 15 generally travels in a direction indicated by the arrow "B." It will be understood material course 42 may be non-linear, and the orientation of arrow "B" may change as head 15 moves along course 42. With reference to FIG. 4A, as the head 15 moves along the course 42, camera 21 captures a series of thermal images ("frames") 44A, 44B, 44C, etc. that form a series 28A of original or initial thermal images or frames.

Images or frames 44A, 44B, 44C, etc. comprise original image data captured by camera 21. Because camera 21 and the heat source (e.g. lamp 19) are moving relative to the part when the frames 44A, 44B, 44C are captured, the portions of the image that are closer to the roller 17 and heat source 19 have been heated more recently than the regions of frames 44A, 44B, 44C, etc. that are further away from roller 19 and heat source 19.

With reference to FIG. 4B, as the camera 21 makes additional passes that are spaced apart along the "Y" axis, additional series of images or frames 28B, 28C, etc. are generated to form a data cube 29. Individual points or regions taken from each original frame/image 44A, 44B, 44C etc. can be assembled to form a temporally synchronized cell or image 44 (FIG. 4). As discussed in more detail below in connection with FIG. 4C, the individual points or areas 46A, 46B, 46C, etc. comprise different areas of the part surface wherein the individual points or small areas 46A, 46B, 46C, etc. show the surface areas at an equal time after the area 46A, 46B, 46C etc. is heated. For example, the image 44 may show a region of the part surface in which the areas 46A, 46B, 46C etc. are all taken from images one second after each individual area 46A, 46B, 46C etc. has been heated. Thus, although the actual surface of the part is heated at different times, the temporally synchronized cell or image 44 is created by taking small points or areas (pixels) from the original images 44A, 44B, 44C, etc. that are reassembled such that the individual areas 46A, 46B, 46C are all shown at the same amount of time after being heated. For example, temporally synchronized image 44 may comprise smaller areas 46A-46I in the form bands that are taken from individual images 44I-44A, respectively (FIG. 4A). The temporally synchronized thermal image 44 is formed using image data for each point that is captured/collected at a time 48 that is after the tow strips 30 have been applied to the substrate. As shown by the line 47, the surface temperature of the tow varies over time. In general, the temperature rises initially as shown by the line segment 47A, reaches a peak at line segment 47B, and then declines as shown by the line segment 47C.

Figure 4C:
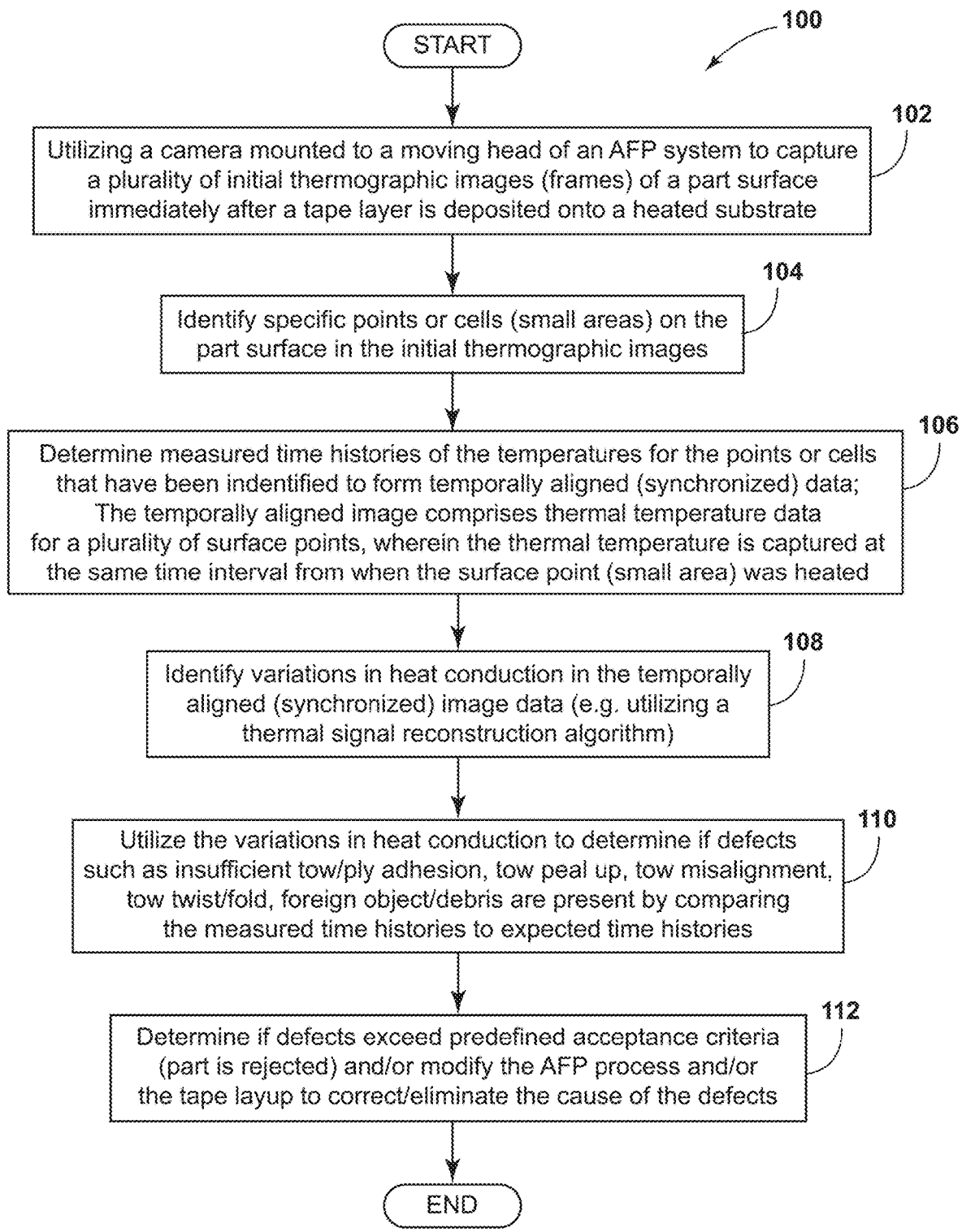
FIG. 4C is a flowchart showing thermographic data processing according to one aspect of the present invention.

With further reference to FIG. 4C, a process 100 according to one aspect of the present invention generally includes a first step 102 in which a camera mounted to a moving head of an AFP system is utilized to capture a plurality of initial thermographic images (frames) of a part surface immediately after a tape layer is deposited onto a heated substrate. Step 102 may, alternatively comprise a line scan process that includes heating a surface of a part without depositing a tape layer. The initial thermographic images include areas that were heated at different times.

At step 104, specific points or cells (small areas or pixels), on the part surface are identified in the initial thermographic images. At step 106, measured time histories of the temperatures for the points are determined, and a temporally aligned (synchronized) image is formed. The temporally aligned image comprises thermal temperature data for a plurality of surface points, wherein the thermal temperature data is captured at the same time interval from when the surface point was heated.

At step 108, variations in the temporally aligned image data (caused by variations in heat conduction) are identified. A thermal signal reconstruction algorithm or other suitable approaches may be utilized to identify and/or evaluate variations. The variations may comprise variations from expected data, or the variations may comprise "absolute" variations in the data.

At step 110, variations in the data (e.g. due to variations in heat conduction) are utilized to determine if defects are present. The temporally aligned data may be evaluated utilizing algorithms (software) previously utilized to analyze thermal image data generated by flash thermography or other such processes. The defects may comprise insufficient tow/ply adhesion, tow peel up, tow misalignment, tow twist/fold, foreign objects/debris, etc. Defects may be detected by comparing the measured time histories to expected time histories. At step 112, if defects exceed predefined acceptance criteria a part may be rejected and/or the layup or process may be modified. The AFP process, tape layup etc. may be modified to correct or eliminate the cause of the defects even if defects do not exceed predefined criteria.

As shown in FIGS. 5-14B, the thermal images generated/captured by camera 21 may include variations due to temperature variations of the surface of the tow after the tow has been applied to the heated substrate. The surface temperature variations may result from material properties below the surface, the use of debulking processes, etc.

Figure 5:
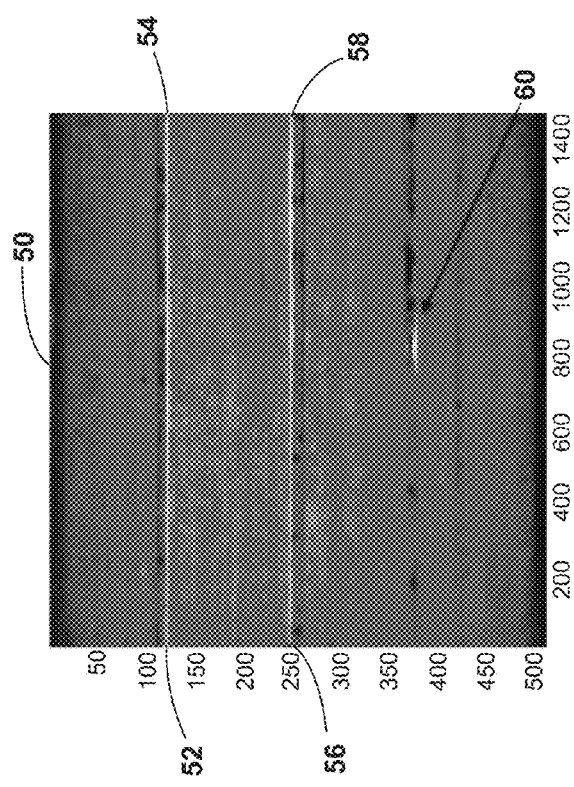
FIG. 5 is a temporally aligned thermographic image of a tow surface.

With reference to FIG. 5, a thermal image 50 shows various features of a substrate immediately following application of tows. Specifically, thermal image 50 includes variations showing a 1/16 inch gap 52 between adjacent tows, and a line 54 corresponding to a 1/16 inch overlap between adjacent tows. A line 56 results from a 1/32 inch gap, and a line 58 results from a 1/32 inch overlap between adjacent tows. Gaps and overlaps may comprise defects if the layup design does not call for these features. A bright spot 60 is caused by twisted tape.

Figure 6:
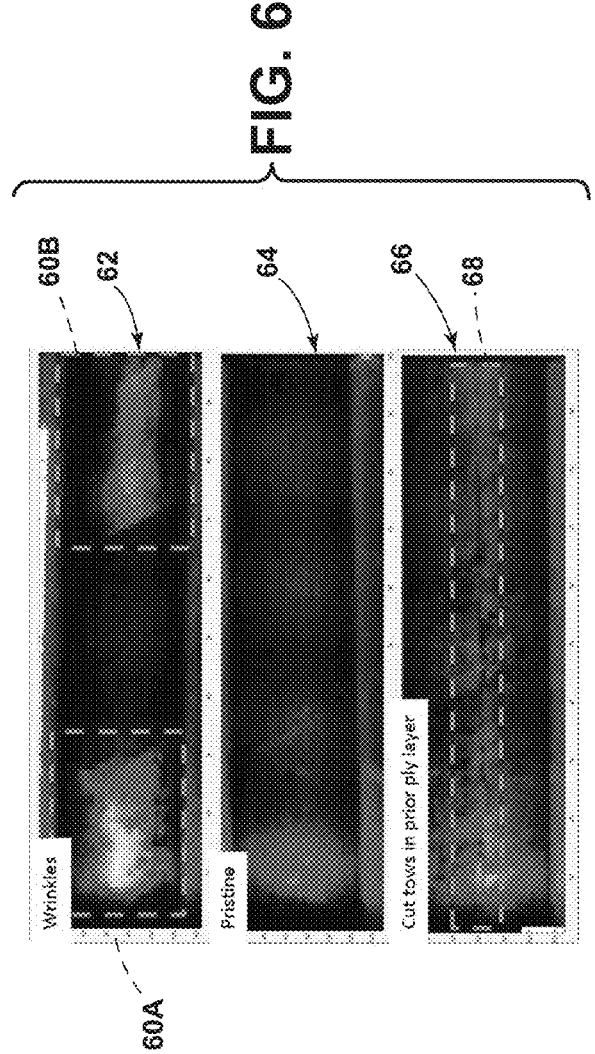
FIG. 6 comprises temporally aligned thermographic images showing tow features.
Figure 7:
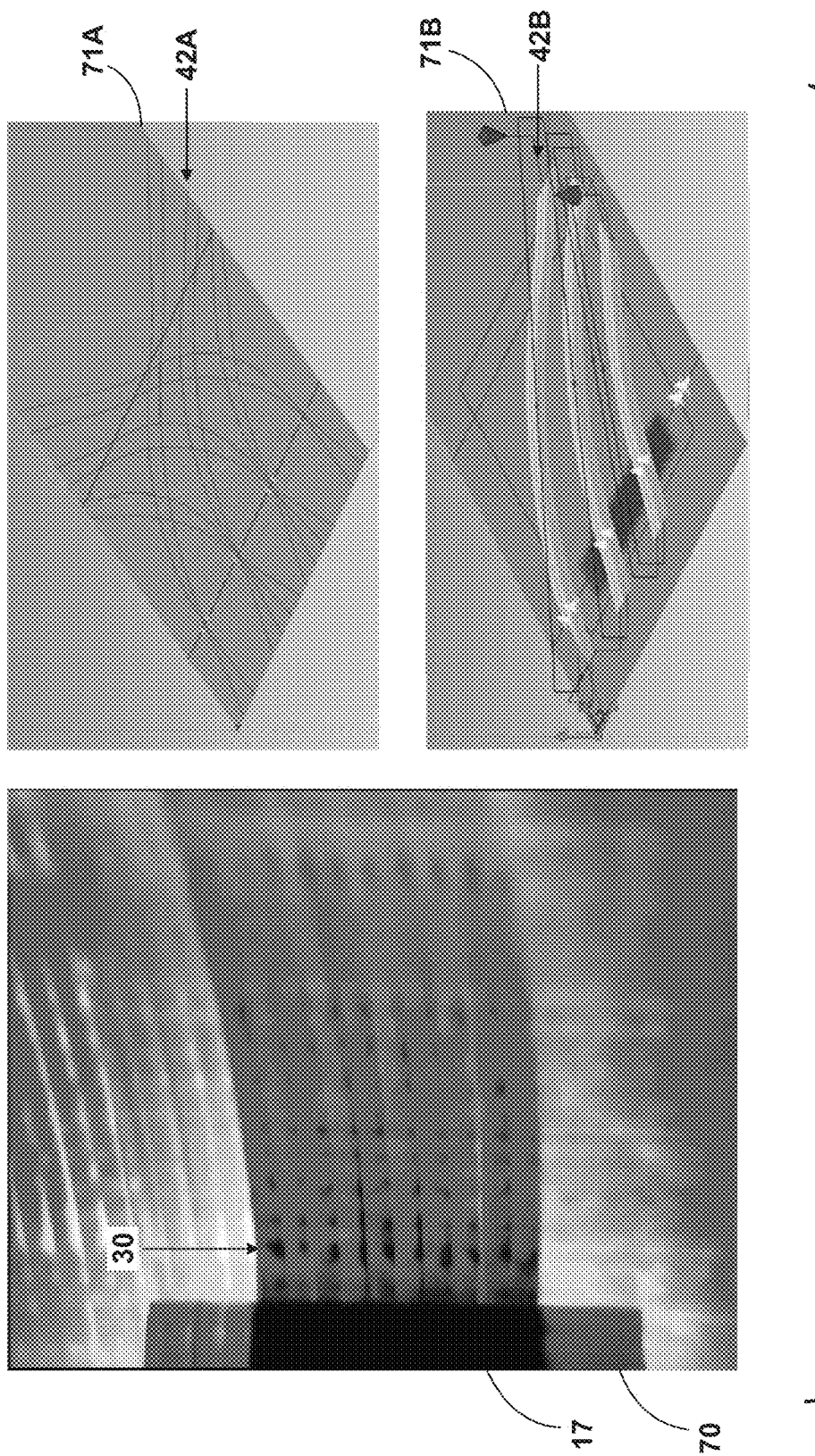
FIG. 7 is a thermographic image of a tow being applied to a heated substrate, and computer-generated schematic views of material courses.

With reference to FIG. 6, a temporally aligned thermal image includes regions 60A and 60B with variations (i.e., lighter portions) 60A and 60B that are the result of wrinkles in the tape. Image 64 generally corresponds to a tape that has been properly applied. Although image 64 includes some intensity variations, the variations are relatively minor, such that the variations do not indicate the presence of a defect. Image 66 includes a region 68 including a darker line formed by cut tows in a prior ply layer. Although cuts could be required in some layups, the cuts may comprise defects if the cuts were made unintentionally.

The thermal image 70 (FIG. 7) shows a prepreg tow 30 immediately after being applied by compaction roller 17. Images 71A and 71B are computer-generated images showing material courses or paths 42A and 42B utilized to deposit tow 30. As discussed above, controller 24 of AFP system 10 may be programmed to cause the head 15 to travel along a series of predefined paths to create a specific layup as required for particular composite structure.

Figure 8:
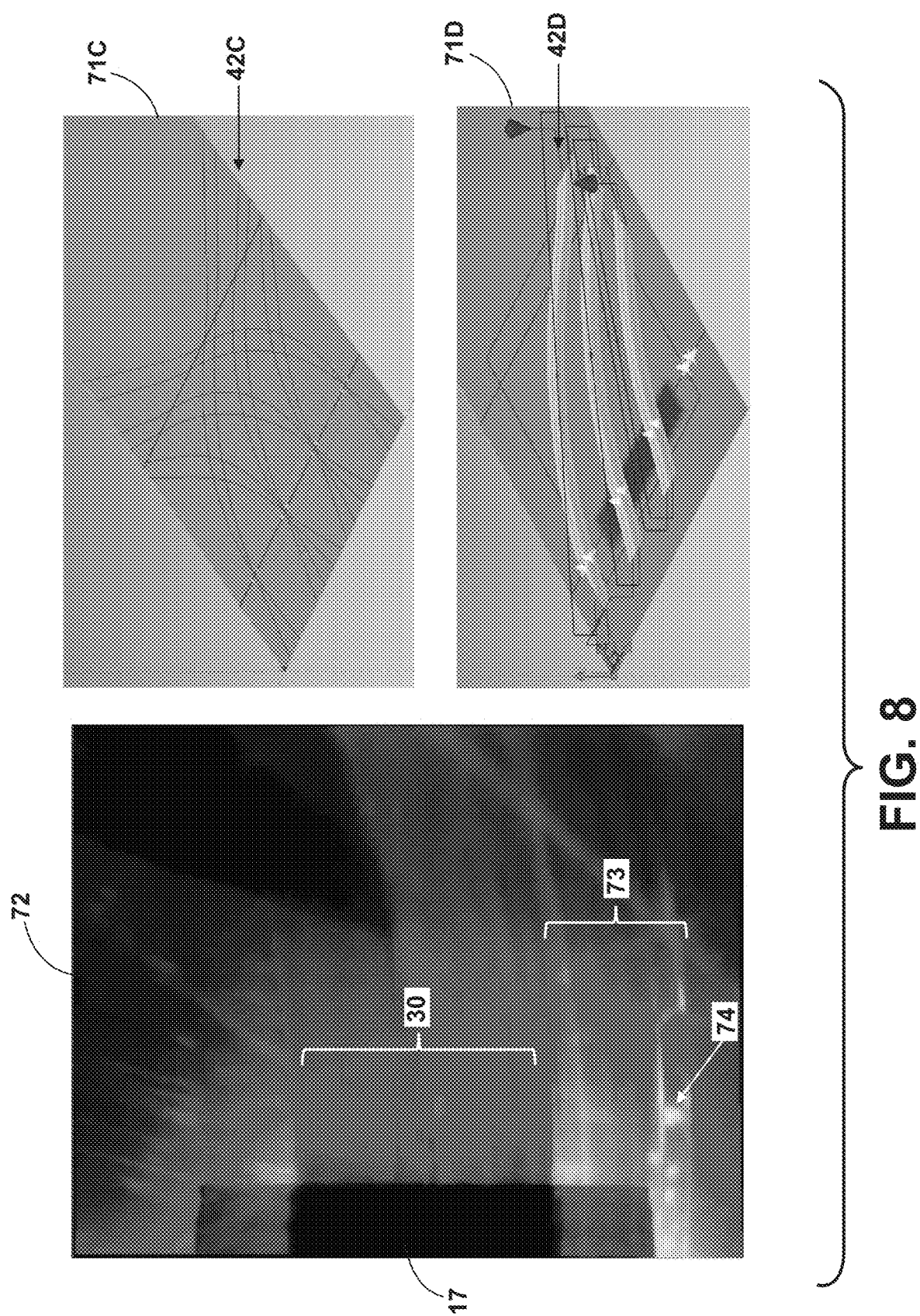
FIG. 8 is a thermographic image of a tow being applied to a heated substrate, and a computer-generated schematic view of material courses.

With reference to FIG. 8, a thermographic image 72 shows a prepreg tow 30 being deposited by compression roller 17. A bright spot 74 is the result of buckling in a tape strip 73. The thermal image 72 generally corresponds to one or more courses or paths 42C, 42D as shown in computer-generated images 71C and 71D, respectively.

Figure 9:
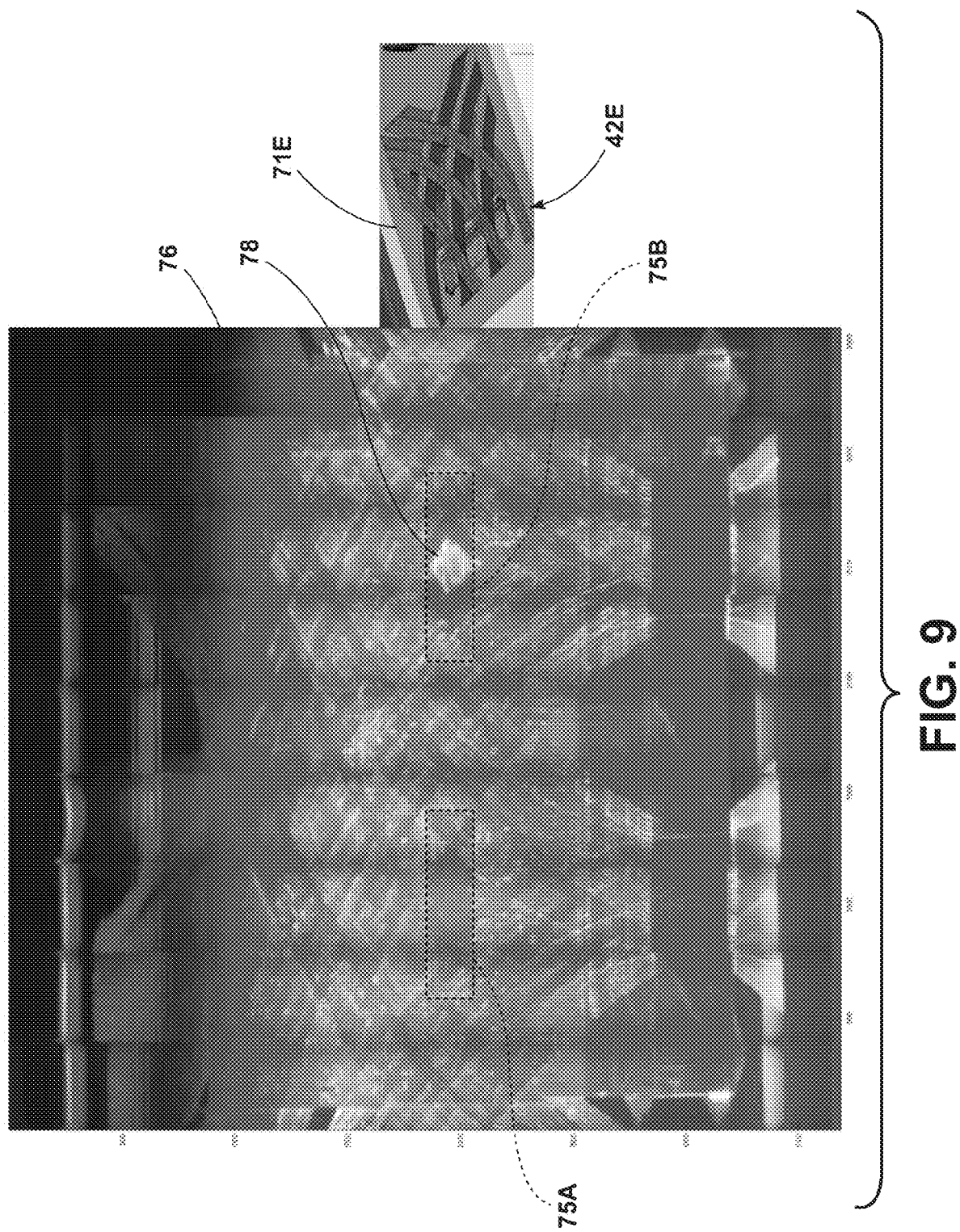
FIG. 9 is a temporally aligned (composite) image generally using a line scan process of a region of a composite structure prior to a debulk process.
Figure 10:
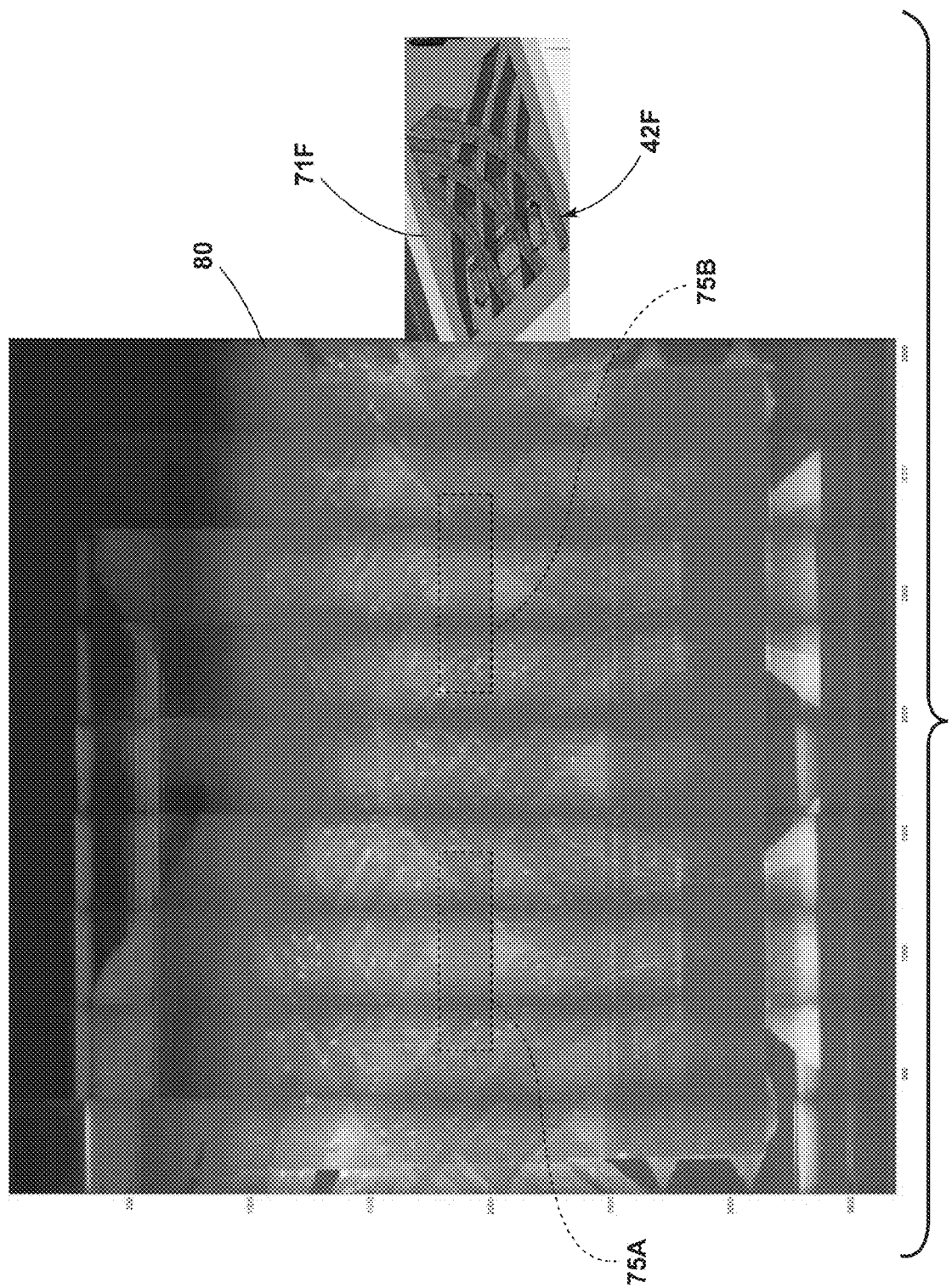
FIG. 10 is a temporally aligned (composite) image generally using a line scan process showing the same region as FIG. 9 after a debulk process.

Referring again to FIG. 2, for testing purposes, a developmental thermal imaging system including camera 21 was mounted on a robotic arm 20 comprising an Integrated Structural Assembly of Advanced Composites (ISAAC) arm of an AFP system 10. The infrared camera 21 included Ethernet-streaming capability, and the camera 21 collected data for a surface area 22 immediately behind the compaction roller 17. This enables the inspection of each ply layer as the heat provided by the heat lamp 19 travels through the ply. The thermal camera 21 captures the differences in temperature after heating, and the temperature differential can be correlated to differences in the material state. Inspection/evaluation may be performed as the ply is being laid up or post layup by re-running the ply program with no feed or compaction, similar to a thermal line scan inspection. FIGS. 9 and 10 were generated from aligned thermal image data collected by the line scan process.

FIGS. 9 and 10 are temporally aligned thermal image data of a region of a composite structure before and after a debulk process, respectively. The thermal image 90A (FIG. 14A) was captured (collected) after a final ply was laid, but prior to debulk. The brighter "hotspots" (e.g. yellow areas 78) indicate areas of poor tow adhesion, tow buckling liftoff, or tow disbond/slippage. Thermal image 80 (FIG. 10) was captured after a 30 minute debulk cycle. Two rectangular patches 75A and 75B of composite material are visible near the center of FIGS. 9 and 10. The bright spot or region 78 is near the center of the patch 76B in FIG. 9. Thermal image 76 (FIG. 9) includes a bright spot or region 78 corresponding to a material that disbonded from the substrate when new material was laid over it. The pressure and direction of roller 17 may cause the composite material to "bunch up" and disbond. This defect may result in a higher temperature region 78. The thermal image 76 generally corresponds to a tow path 42E of computer-generated image 71E.

With reference to FIG. 10, a thermal image 80 taken after a debulk cycle of the part shown in FIG. 9 corresponds to a path 42F as shown in computer-generated image 71F. The thermal image 80 includes some lighter regions which generally correspond to areas of higher temperature. However, the image 80 does not include bright spots or other variations indicative of defects.

The differences between the thermal images 76 and 80 of FIGS. 9 and 10 indicate that the debulking cycle significantly reduced the areas with poor adhesion. More specifically, the reduction in yellow "hot spots" in FIG. 10 show that regions of reduced heat transfer due to poor adhesion between plys were significantly reduced by the debulking process. The image data may be aligned utilizing a manual or automated process to combine all or part of individual images to make a composite image of the larger whole. In this way, individual images may be aligned in space and time. As noted above, FIG. 9 shows the panel after the final ply layer, prior to debulk, and FIG. 10 shows the panel after a 30 minute debulking cycle. From the temperature differential (or "hotspots") in images 76 and 80, changes in tow adhesion due to partial or complete tow disbond and liftoff can be inferred/detected. A comparison between images 76 and 80 implies that the debulking cycle corrected many of the tow defects, and that many of the tow buckling/liftoff defects that remain are either grouped together or at areas of intersecting geometric features. Areas of intersecting geometric features may comprise locations where plies do not cover the entire region, and are instead made up of small patches or tow steered courses or strips.

Figure 11:
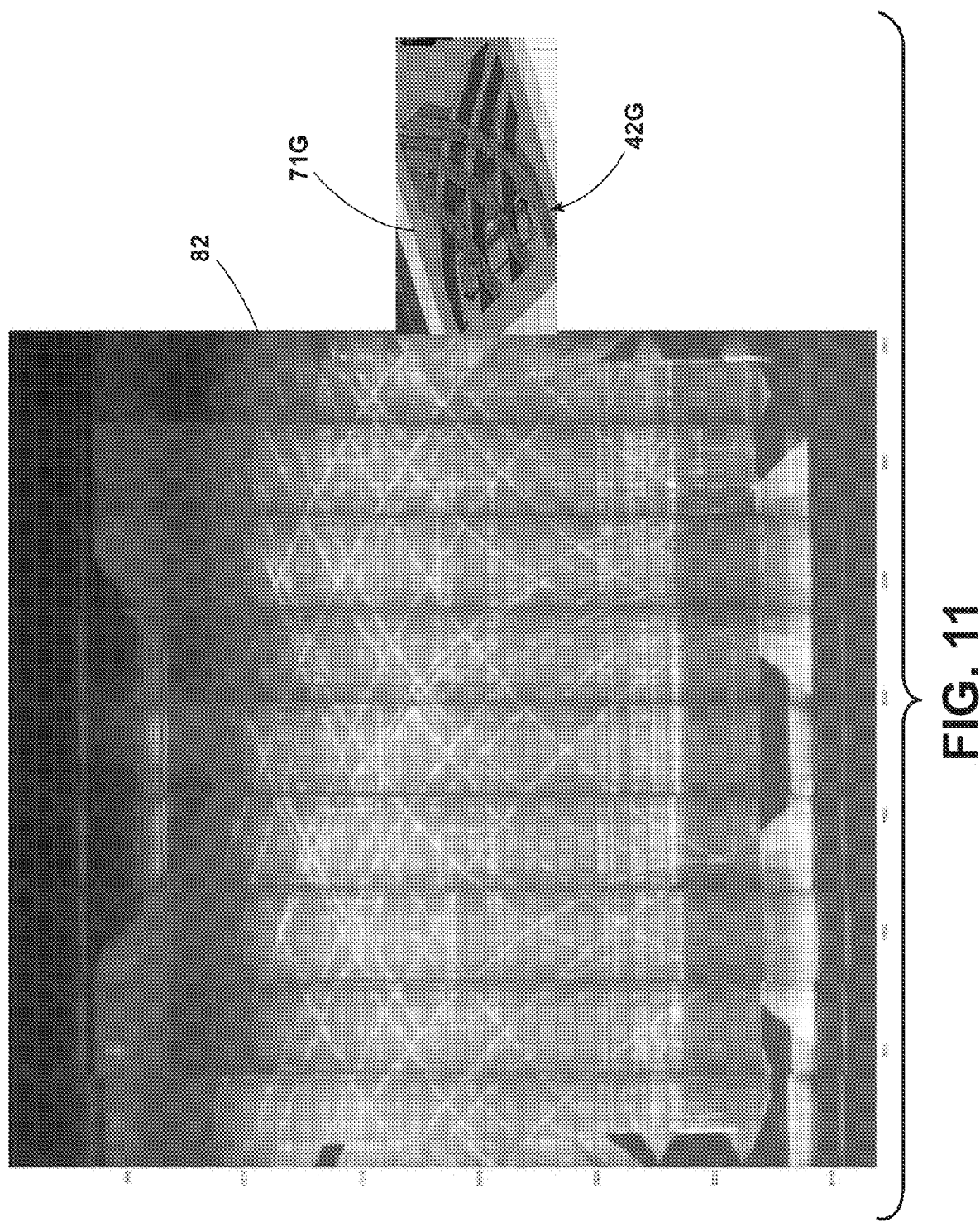
FIG. 11 is a temporally aligned (composite) image of data taken during layup of a final acrage ply, wherein all three images are processed to view a single time step.

With further reference to FIG. 11, a thermal image 82 corresponds to a path 42G of computer-generated image 71G. The thermal image 82 includes lighter regions corresponding to "normal" gaps or "bridging" that occurs when tows are laid over thickness changes. Image 82 is from a line scan where heat is being applied to the top of the surface. The thin layer of bridging is not transmitting heat to the surface below it.

Figure 12:
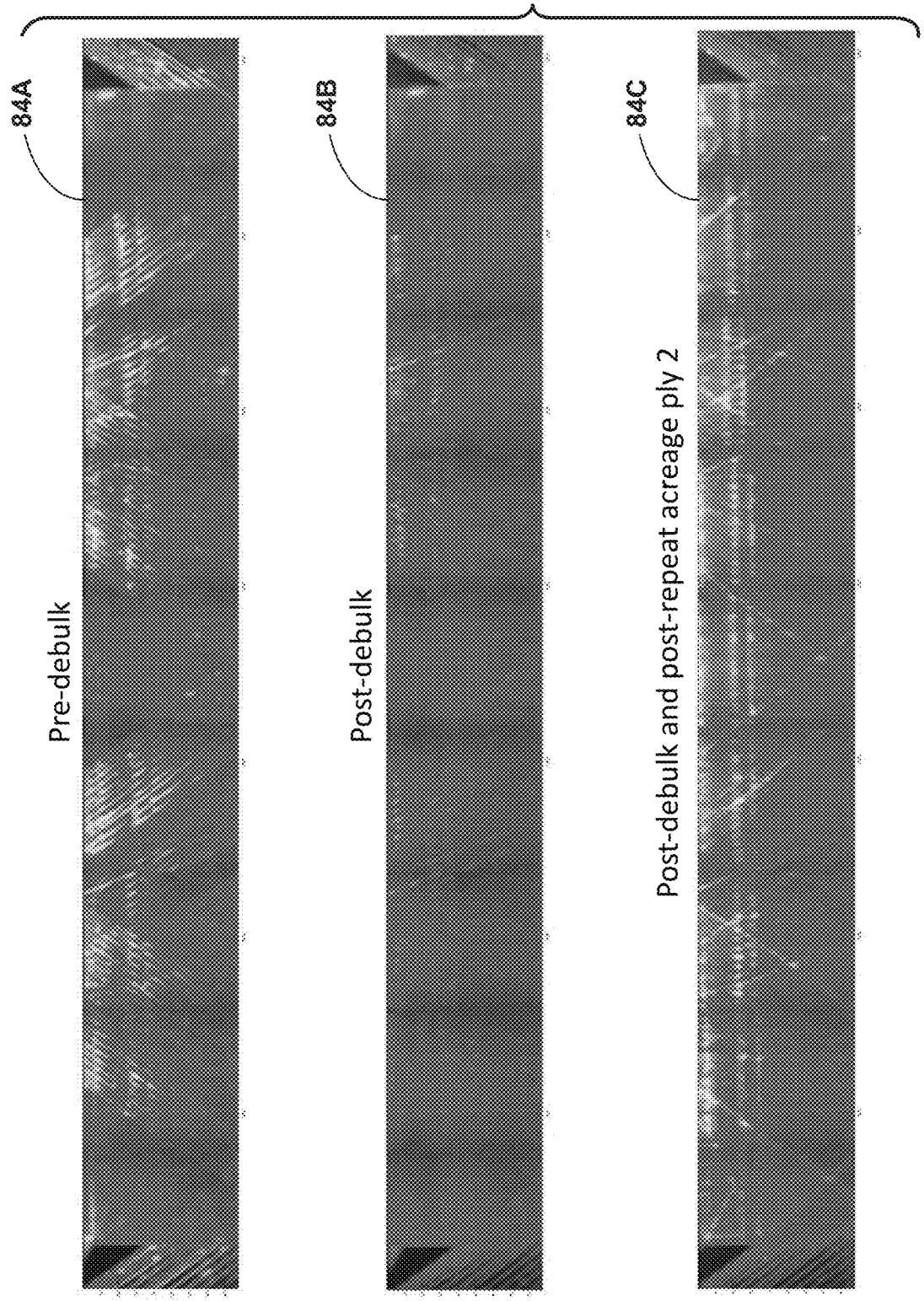
FIG. 12 comprises temporally aligned thermographic image data from FIGS. 9, 10, and 11 for a composite structure pre-debulk, post-debulk, and post-repeat acreage ply 2.

With further reference to FIG. 12, thermal images 84A, 84B and 84C are enlarged portions of temporally aligned images 76 (FIG. 9), 80 (FIG. 10), and 8 (FIG. 11), respectively. Image 84A was generated after applying a prepreg tow to a heated substrate, but prior to a debulking process. Thermal image 84B is a thermal image corresponding to the same surface area of a composite part as the image 84A. However, image 84B was generated after a debulk process. As discussed above, thermal images (e.g. pre-debulk thermal image 84A) may be captured while the prepreg tow strips 30 are being applied. The post-debulk thermal image 84B may be captured by causing the head 15 of AFP system 10 to follow the same path utilized to lay the prepreg at the time thermal image 84A was generated, but without depositing additional tow strips. Thermal image 84C corresponds to a post-debulk and post-repeat acreage ply 2.

With further reference to FIG. 13, a thermal image 86A was generated pre-debulk as prepreg tow was being applied. Thermal image 86B is the same area of a composite structure after a debulk procedure. As discussed above in connection with FIGS. 9 and 10, a bright spot 78 in thermal image 86A corresponds to a region or patch of material that disbanded from the substrate when new material was laid over it. The pressure and direction of the roller 17 may cause it to 'bunch up' and disbond (lose adhesion), resulting in a defect due to poor adhesion. Image 86B shows that the defect was eliminated by the debulking process. Thermal image 86C shows the same surface region of a composite structure post-debulk and post-repeat acreage ply 2. The images show that the debulk cycle reduced the areas of poor adhesion, except in areas where poor adhesion is expected as a result of geometry.

In situ thermographic inspection according to the present invention provides information concerning laminate quality of AFP-fabrication parts. Raw thermal data shows that laps, gaps, and twists create significant relative temperature indications for detection. Additionally, areas of reduced adhesion can be identified by visually inspecting the images and/or with data processing. Testing demonstrated that in situ efforts taken during fabrication can reduce risk of flaws in post-cure parts, and increase laminate quality. Deviation from an expected value for each pixel may be utilized to compare data sets. It was observed that the distribution of this deviation narrowed after debulking, meaning the temperature of the surface was more even over the entire part. From this observation it was inferred that debulking decreased peel up.

The data described above in connection with FIGS. 3A-3C were for simple raster type scans so that position data could be deduced. However, position synced data based on the machine coordinates of the AFP head may also be utilized. This allows frame registration of even the most complex geometry. This also allows for more complex scan patterns and an in-depth signal analysis of the thermography data beyond simple computer vision.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of detecting defects in a composite structure fabricated by an automated fiber placement (AFP) process, the method comprising:
   applying heat to the surface of a composite structure using a heat source that moves relative to the composite structure;
   capturing a series of initial thermographic images of the surface of the composite structure after heating the surface using a camera that moves with the heat source relative to the composite structure;
   forming temporally synchronized images comprising sections of a plurality of the initial thermographic images, wherein the sections correspond to portions of the surface that were heated at the same time interval prior to capturing the image section;
   wherein the temporally synchronized images include variations;
   utilizing variations in the thermographic data for the surface to detect one or more defects in the composite structure.

2. The method of claim 1, wherein:
   the sections of the initial thermographic images comprise pixels.

3. The method of claim 2, including:
   using the series of initial thermographic images to form a data cube having two spatial dimensions and one time dimension.

4. The method of claim 1, wherein:
   forming at least one temporally synchronized image includes time shifting a plurality of pixels to correct for heating delay in the initial thermographic images.

5. The method of claim 4, including:
   correcting the temporally synchronized images to compensate for varying amounts of heat being applied to the composite structure over time.

6. The method of claim 5, including:

determining an expected value of a temperature for the pixels in the temporally synchronized images utilizing correction weights based on overall heating trends.

7. The method of claim 6, including:

determining if deviations from the expect values has occurred.

8. The method of claim 7, including:

utilizing deviations from the expected values to determine if defects are present in the composite structure.

9. The method of claim 1, wherein:

the composite structure is fabricated utilizing an automated fiber placement (AFP) system having a head including a tow applicator that moves relative to the composite structure and applies at least one tow during fabrication of the composite structure; and the thermographic data is captured by at least one thermal camera mounted to the head after the at least one tow is applied.

10. The method of claim 9, wherein:

the selected surface region is heated utilizing a lamp mounted on the head whereby a surface of the composite structure is heated before the at least one tow is applied.

11. The method of claim 10, wherein:

the at least one thermal camera captures sets of thermographic data at a rate of at least about 60 frames per second while the head is moving relative to the composite structure.

12. The method of claim 6, wherein:

the temporally synchronized images include color and/or intensity variations corresponding to differences in surface temperatures caused by defects in the composite structure.

13. The method of claim 12, wherein:

the at least one defect comprises a material state.

14. The method of claim 12, wherein:

the at least one defect is selected from the group consisting of insufficient tow adhesion, tow buckling, tow lift off, tow disbonding, and tow slippage.

15. The method of claim 1, including:

forming first and second temporally synchronized images using thermographic images captured before and after, debulking the composite structure, respectively;

detecting changes in the composite structure caused by the debulking process utilizing differences between the first and second temporally synchronized images.

16. The method of claim 10, including:

collecting thermographic images after a final ply of the composite structure has been laid utilizing at least one thermal camera mounted to a tow-dispensing head of an automated fiber placement (AFP) system.

* * * * *